US012456820B2

(12) United States Patent
Patel et al.

(10) Patent No.: US 12,456,820 B2
(45) Date of Patent: Oct. 28, 2025

(54) ANTENNA SYSTEM WITH MULTIPLE SYNCHRONOUSLY MOVABLE FEEDS

(71) Applicant: Sea Tel, Inc., Concord, CA (US)

(72) Inventors: Trushar D. Patel, Hercules, CA (US); Tuncer Ede, Pittsburg, CA (US)

(73) Assignee: Sea Tel, Inc., Concord, CA (US)

( * ) Notice: Subject to any disclaimer, the term of this patent is extended or adjusted under 35 U.S.C. 154(b) by 98 days.

(21) Appl. No.: 17/488,232

(22) Filed: Sep. 28, 2021

(65) Prior Publication Data

US 2022/0123476 A1 Apr. 21, 2022

Related U.S. Application Data

(63) Continuation of application No. 16/044,446, filed on Jul. 24, 2018, now Pat. No. 11,133,598.
(Continued)

(51) Int. Cl.
*H01Q 19/18* (2006.01)
*H01Q 1/12* (2006.01)
(Continued)

(52) U.S. Cl.
CPC .......... *H01Q 19/18* (2013.01); *H01Q 1/1264* (2013.01); *H01Q 1/34* (2013.01); *H01Q 3/08* (2013.01);
(Continued)

(58) Field of Classification Search
CPC ........ H01Q 19/18; H01Q 1/1264; H01Q 1/34; H01Q 3/08; H01Q 5/35; H01Q 19/19;
(Continued)

(56) References Cited

U.S. PATENT DOCUMENTS 3,541,561 A 11/1970 Chubb, Jr.
3,999,184 A 12/1976 Fuss, III
(Continued)

FOREIGN PATENT DOCUMENTS

EP 2312693 A2 4/2011
KR 20030085358 A * 11/2003
(Continued)

OTHER PUBLICATIONS

"Block upconverter", Wikipedia website, captured in Nov. 2016 on Wayback Machine https://en.wikipedia.org/wiki/Block_upconverter (Year: 2016).*
(Continued)

*Primary Examiner* — Dameon E Levi
*Assistant Examiner* — Anh N Ho

(57) ABSTRACT

The antenna system and the method receive signals having radio frequencies in a plurality of radio frequency bands. The antenna system includes a support assembly, a primary reflector that is coupled to the support assembly, a feed assembly that is movably coupled to the support assembly, and a first feed and a second feed fixedly coupled to the feed assembly. The first feed and the second feed are configured to communicate RF signals in a first frequency band and a second frequency band, respectively, of the plurality of frequency bands. The antenna system also includes a first actuator that is configured to move the feed assembly from a first feed assembly position, where the first feed is positioned along a first signal path with the primary reflector, to a second feed assembly position, where the second feed is positioned along a second signal path with the primary reflector.

14 Claims, 38 Drawing Sheets

Related U.S. Application Data

(60) Provisional application No. 62/536,602, filed on Jul. 25, 2017.

(51) Int. Cl.

| | |
|---|---|
| ***H01Q 1/34*** | (2006.01) |
| ***H01Q 1/42*** | (2006.01) |
| ***H01Q 3/08*** | (2006.01) |
| ***H01Q 5/35*** | (2015.01) |
| ***H01Q 19/19*** | (2006.01) |

(52) U.S. Cl.
CPC ............... *H01Q 5/35* (2015.01); *H01Q 19/19* (2013.01); *H01Q 1/42* (2013.01)

(58) Field of Classification Search
CPC ............ H01Q 1/42; H01Q 19/17; H01Q 5/45; H01Q 3/18; H01Q 19/191
See application file for complete search history.

(56) References Cited

U.S. PATENT DOCUMENTS

| | | | | |
|---|---|---|---|---|
| 5,485,168 | A | 1/1996 | Parekh | |
| 5,751,254 | A * | 5/1998 | Bird | H01Q 3/18 343/781 CA |
| 6,545,645 | B1 | 4/2003 | Wu | |
| 6,795,034 | B2 | 9/2004 | Lyerly et al. | |
| 7,038,632 | B2 | 5/2006 | Webb et al. | |
| 9,929,474 | B2 | 3/2018 | Adada et al. | |
| 10,170,842 | B2 | 1/2019 | Adada et al. | |
| 10,249,951 | B2 | 4/2019 | Runyon et al. | |
| 10,498,043 | B2 | 12/2019 | Adada et al. | |
| 2004/0008148 | A1 | 1/2004 | Lyerly et al. | |
| 2005/0110694 | A1 | 5/2005 | Webb et al. | |
| 2010/0013727 | A1 | 1/2010 | Pifer et al. | |
| 2010/0238082 | A1* | 9/2010 | Kits van Heyningen | H01Q 15/0013 343/779 |
| 2011/0068988 | A1* | 3/2011 | Monte | H01Q 3/18 343/781 CA |
| 2012/0182195 | A1* | 7/2012 | Monte | H01Q 5/45 343/779 |
| 2013/0249754 | A1* | 9/2013 | Rice, I | H01P 1/173 343/756 |
| 2015/0097727 | A1* | 4/2015 | Ozaki | H01Q 19/17 342/385 |
| 2015/0168486 | A1* | 6/2015 | Isaac | G01R 31/2822 324/756.02 |
| 2016/0141758 | A1 | 5/2016 | Eom et al. | |
| 2016/0344107 | A1 | 11/2016 | Wong et al. | |
| 2017/0005415 | A1 | 1/2017 | Adada et al. | |
| 2017/0214145 | A1* | 7/2017 | Elad | H01Q 19/175 |
| 2017/0250455 | A1 | 8/2017 | Runyon et al. | |
| 2018/0183153 | A1 | 6/2018 | Adada et al. | |
| 2018/0269588 | A1 | 9/2018 | Adada et al. | |
| 2020/0052411 | A1* | 2/2020 | Noh | H01Q 19/19 |
| 2020/0067196 | A1 | 2/2020 | Adada et al. | |

FOREIGN PATENT DOCUMENTS

| | | | | | |
|---|---|---|---|---|---|
| KR | 20140044549 | A | * | 4/2014 | |
| TW | 527750 | B | * | 4/2003 | |
| WO | WO-0054088 | A1 | * | 9/2000 | B64G 1/66 |
| WO | WO-02075849 | A1 | * | 9/2002 | H01Q 1/1235 |
| WO | WO-2016054324 | A1 | * | 4/2016 | H01Q 1/084 |

OTHER PUBLICATIONS

"The Basics of Solenoids and Electric Motors", Streetdirectory.com website, captured in Dec. 2016 on Wayback Machine https://www.streetdirectory.com/travel_guide/134734/technology/the_basics_of_solenoids_and_electric_motors.html (Year: 2016).*

"Linear Solenoid Actuator Theory and Tutorial", captured in Nov. 2016 on Wayback Machine https://www.electronics-tutorials.ws/io/io_6.html (Year: 2016).*

Patel, Office Action, U.S. Appl. No. 16/044,446, Aug. 28, 2020, 10 pgs.

Patel, Final Office Action, U.S. Appl. No. 16/044,446, Jan. 29, 2021, 13 pgs.

Patel, Notice of Allowance, U.S. Appl. No. 16/044,446, May 21, 2021, 8 pgs.

* cited by examiner

3300

ANTENNA SYSTEM WITH MULTIPLE SYNCHRONOUSLY MOVABLE FEEDS

RELATED APPLICATIONS

This application is a Continuation Patent Application which claims priority to U.S. patent application Ser. No. 16/044,446, filed Jul. 24, 2018, entitled "Antenna System for Multiple Synchronously Movable Feeds", which claims priority to U.S. Provisional Patent Application No. 62/536,602, filed Jul. 25, 2017, entitled, "Antenna System with Multiple Synchronously Movable Feeds," which are hereby incorporated by reference in their entirety.

TECHNICAL FIELD

This disclosure relates generally to multiple-feed antenna systems, and more particularly to synchronous movement of multiple feeds of a multiple-feed antenna.

BACKGROUND

Tracking antenna systems are especially suitable for use aboard ships to track communications satellites while accommodating for roll, pitch, yaw, and other motion of ships at sea. For such systems to operate effectively, they must direct one or more antennas continuously and accurately toward a communications satellite of interest.

Because different communication bands offer various advantages, there is an increasing demand for multi-band antennas capable of receiving satellite communication signals in multiple communication bands. For example, C-band signals are susceptible to terrestrial interference, while $K_u$-band signals are affected by weather, such as rain and ice crystals in the atmosphere. The $K_a$-band allows higher bandwidth communications than the C-band and the $K_u$-band, but is more susceptible to interference from weather, such as rain, than $K_u$-band signals. Accordingly, it is desirable for an antenna system to be configured for operation in multiple bands, such as the C-band, the $K_u$-band, and the $K_a$-band.

As the number of feeds included in an antenna system increases, there is a need for technology for adjusting the position of the feeds relative to a reflector to switch the feed that receives and transmits reflected signals.

SUMMARY

Without limiting the scope of the appended claims, after considering this disclosure, and particularly after considering the section entitled "Detailed Description," one will understand how the aspects of various embodiments are used to determine when a tracked user device is not at an indicated area.

In some embodiments, an antenna system for communicating signals having radio frequencies in a plurality of radio frequency (RF) bands includes a support assembly, a primary reflector that is coupled to the support assembly, a feed assembly that is movably coupled to the support assembly, a first feed fixedly coupled to the feed platform, and a second feed fixedly coupled to the feed platform. The primary reflector is configured to receive and reflect RF signals in the plurality of frequency bands. The first feed is configured to communicate RF signals in a first frequency band of the plurality of frequency bands. The second feed is configured to communicate RF signals in a second frequency band of the plurality of frequency bands. The antenna system also includes a first actuator that is configured to move the feed assembly from a first feed assembly position, where the first feed is positioned along a first signal path with the primary reflector, to a second feed assembly position, where the second feed is positioned along a second signal path with the primary reflector.

In some embodiments, the antenna system includes a third feed fixedly is coupled to the support assembly. The third feed is configured to communicate RF signals in a third frequency band of the plurality of frequency bands. The antenna system also includes a subreflector movably coupled to the support assembly, wherein the subreflector is movable, by a second actuator, between a first subreflector position and a second subreflector position, and wherein the antenna system is configured such that: when the subreflector assembly is in the first subreflector position and the feed assembly is in the first feed assembly position, the subreflector assembly is positioned along the first signal path to reflect RF signals in the first frequency band between the primary reflector and the first feed; when the subreflector assembly is in the first subreflector position and the feed assembly is in the second feed assembly position, the subreflector assembly is positioned along the second signal path to reflect RF signals in the second frequency band between the primary reflector and the second feed; and when the subreflector assembly is in the second subreflector position, the third feed is positioned to receive RF signals in a third frequency band of the plurality of frequency bands directly from the primary reflector.

In some embodiments, when the subreflector assembly is in the first subreflector position, the subreflector assembly intersects at least one of the first signal path or the second signal path.

In some embodiments, the antenna system is configured such that: when the feed assembly is in the first feed assembly position, the second feed is not positioned to communicate RF signals in the second frequency band; and when the feed assembly is in the second feed assembly position, the first feed is not positioned to communicate RF signals in the first frequency band.

In some embodiments, the first actuator includes a first motor that is configured to drive a first lead screw and the first lead screw is coupled to the feed assembly, such that the driving of the first lead screw causes movement of the feed assembly.

In some embodiments, the antenna system includes a counterbalance that is movably coupled to the support assembly. The counterbalance is configured to dynamically balance movement of the feed assembly via movement in a direction that is opposite to the direction of motion of the feed assembly.

In some embodiments, the counterbalance includes a plurality of weight components.

In some embodiments, the counterbalance includes a block upconverter configured to convert signals generated by a signal generator to signals having frequencies in the first frequency band for transmission by the first feed and convert signals generated by the signal generator to signals having frequencies in the second frequency band for transmission by the second feed.

In some embodiments, the first actuator is a first motor that is configured to drive a rotatable shaft and the antenna system includes a second motor that is configured to drive the counterbalance.

In some embodiments, the first actuator is a motor that is configured to drive a rotatable shaft; the rotatable shaft is coupled to a first connector assembly configured to drive the feed assembly; and the rotatable shaft is coupled to a second connector assembly configured to drive the counterbalance.

In some embodiments, a third actuator includes a second motor that is configured to drive a second lead screw and the second lead screw is coupled to the counterbalance, such that the driving of the second lead screw causes movement of the counterbalance.

In some embodiments, the first actuator is a first motor and a third actuator is a second motor connected in series with the first motor. The third actuator is configured to move the counterbalance from a first counterbalance position to a second counterbalance position. In some embodiments, a condition of the first motor that affects operation of the first motor causes, via the serial connection between the first motor and the second motor, operation of the second motor to be altered such that balance between the feed assembly and the counterbalance is maintained.

In some embodiments, the first actuator is a first solenoid that is coupled to the feed assembly. In some embodiments, the antenna system includes a second solenoid that is coupled to the counterbalance.

In some embodiments, the primary reflector is positioned between the feed assembly and the counterbalance.

In some embodiments, a first rubberized waveguide is coupled to the first feed and configured to receive the first RF signal from the first feed and a second rubberized waveguide I coupled to the second feed and configured to receive the second RF signal from the second feed.

In some embodiments, the feed assembly moves along a linear path between the first feed assembly position and the second feed assembly position.

In some embodiments, the feed assembly moves along a rotational path between the first feed assembly position and the second feed assembly position.

In some embodiments, a method for receiving signals having frequencies in a plurality of radio frequency (RF) frequency ranges is implemented at an antenna system that includes: a support assembly; a primary reflector that is coupled to the support assembly, wherein the primary reflector receives and reflects RF signals in a plurality of frequency bands; a feed assembly that is movably coupled to the support assembly; a first actuator configured to move the feed assembly; a first feed fixedly coupled to the feed assembly; and a second feed fixedly coupled to the feed assembly. The method includes moving, by the first actuator, the feed assembly between a first feed assembly position and a second feed assembly position. The method also includes, when the feed assembly is in the first feed assembly position, receiving, by the first feed, a first RF signal in a first frequency band of the plurality of frequency bands reflected from the primary reflector. The method also includes, when the feed assembly is in the second feed assembly position, receiving, by the second RF feed, a second signal in a second frequency band of the plurality of frequency bands reflected from the primary reflector.

In some embodiments, the method includes moving, by a second actuator, a subreflector assembly from a first subreflector position to a second subreflector position. When the subreflector assembly is in the first subreflector position and the feed assembly is in the first feed assembly position, the subreflector assembly reflects the first RF signal received from the primary reflector to the first feed. When the subreflector assembly is in the first subreflector position and the feed assembly is in the second feed assembly position, the subreflector assembly reflects the second RF signal received from the primary reflector to the second feed. When the subreflector assembly is in the second subreflector position, a third feed receives a third RF signal in a third frequency band, directly from the primary reflector.

In some embodiments, when the subreflector assembly is in the first subreflector position and the feed assembly is in the first feed assembly position, the subreflector assembly reflects a fourth RF signal in the first frequency band transmitted from the first feed to the primary reflector. When the subreflector assembly is in the first subreflector position and the feed assembly is in the second feed assembly position, the subreflector assembly reflects a fifth RF signal in the second frequency band transmitted from the second feed to the primary reflector. When the subreflector assembly is in the second subreflector position, the third feed transmits a sixth RF signal in the third frequency band directly to the primary reflector.

In some embodiments, the method includes moving a counterbalance that is movably coupled to the support assembly. The counterbalance is configured to dynamically balance movement of the feed assembly via movement in a direction that is opposite to the direction of motion of the feed assembly.

In some embodiments, the method includes converting, by a block upconverter included in the counterbalance, signals generated by a signal generator to the first frequency band for transmission by the first feed. In some embodiments, the method includes converting, by the block upconverter, signals generated by the signal generator to the second frequency band for transmission by the second feed.

In some embodiments, the method includes moving the feed assembly along a linear path between the first feed assembly position and the second feed assembly position.

In some embodiments, the method includes moving the feed assembly along a rotational path between the first feed assembly position and the second feed assembly position.

In some embodiments, an antenna system for receiving signals having frequencies in a plurality of radio frequency (RF) frequency bands includes support means for supporting a primary reflector, wherein the primary reflector receives and reflects RF signals in a plurality of frequency bands; a feed assembly that is movably coupled to the support means; a first signal receiving means fixedly coupled to the feed assembly; a second signal receiving means fixedly coupled to the feed assembly; and means for moving the feed assembly from a first feed assembly position, where the first feed is positioned to receive a first RF signal in a first frequency band of the plurality of frequency bands from the primary reflector, to a second feed assembly position, where the second feed is positioned to receive a second RF signal in a second frequency band of the plurality of frequency bands from the primary reflector.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

In accordance with common practice, some of the drawings may not depict all of the components of a given system, method or device. Finally, like reference numerals may be used to denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as not to unnecessarily obscure pertinent aspects of the embodiments described herein.

Figure 1:
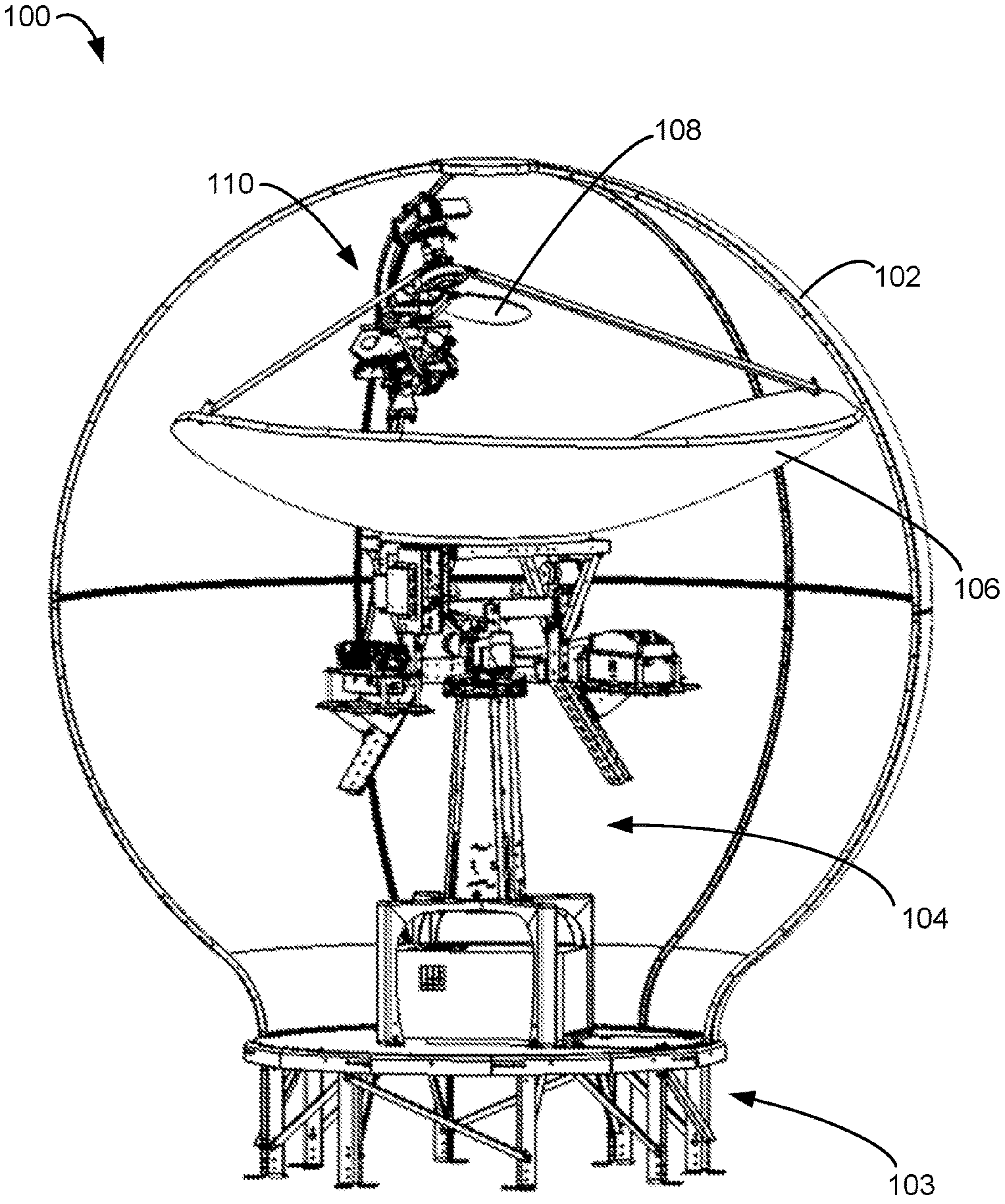
FIG. 1 is a front perspective view of an antenna system for receiving signals having radio frequencies in a plurality of radio frequency (RF) ranges, in accordance with some embodiments.

FIG. 1 shows a front perspective view of an antenna system 100 for receiving signals having radio frequencies in a plurality of radio frequency (RF) frequency ranges, in accordance with some embodiments. In some embodiments, antenna system 100 is enclosed within a radome 102 (shown cut away to show antenna system 100). In some embodiments, radome 102 is mounted on a base 103. Radome 102 protects antenna system 100 from exposure to adverse conditions such as sun, inclement weather, etc. while antenna system 100 is mounted outdoors (e.g., on a ship or other moving vessel).

Antenna system 100 includes a primary reflector 106 (e.g., a parabolic reflector) coupled to a support assembly 104. In some embodiments, the support assembly 104 is mounted on base 103. In some embodiments, primary reflector 106 is configured to reflect (to or from a satellite) RF signals in a plurality of frequency bands (for example, the C-band (e.g., 4-8 GHz), the $K_u$-band (e.g., 12-18 GHz), and/or the $K_a$-band (e.g., 26.5-40 GHz)).

Antenna system 100 includes a subreflector assembly 108 that is movably coupled to support assembly 104. For example, subreflector assembly 108 is movably coupled to a support sub-assembly 110 of support assembly 104. Subreflector assembly 108 is movable between a first subreflector position and a second subreflector position (e.g., as illustrated by FIGS. 3-4).

Figure 2:
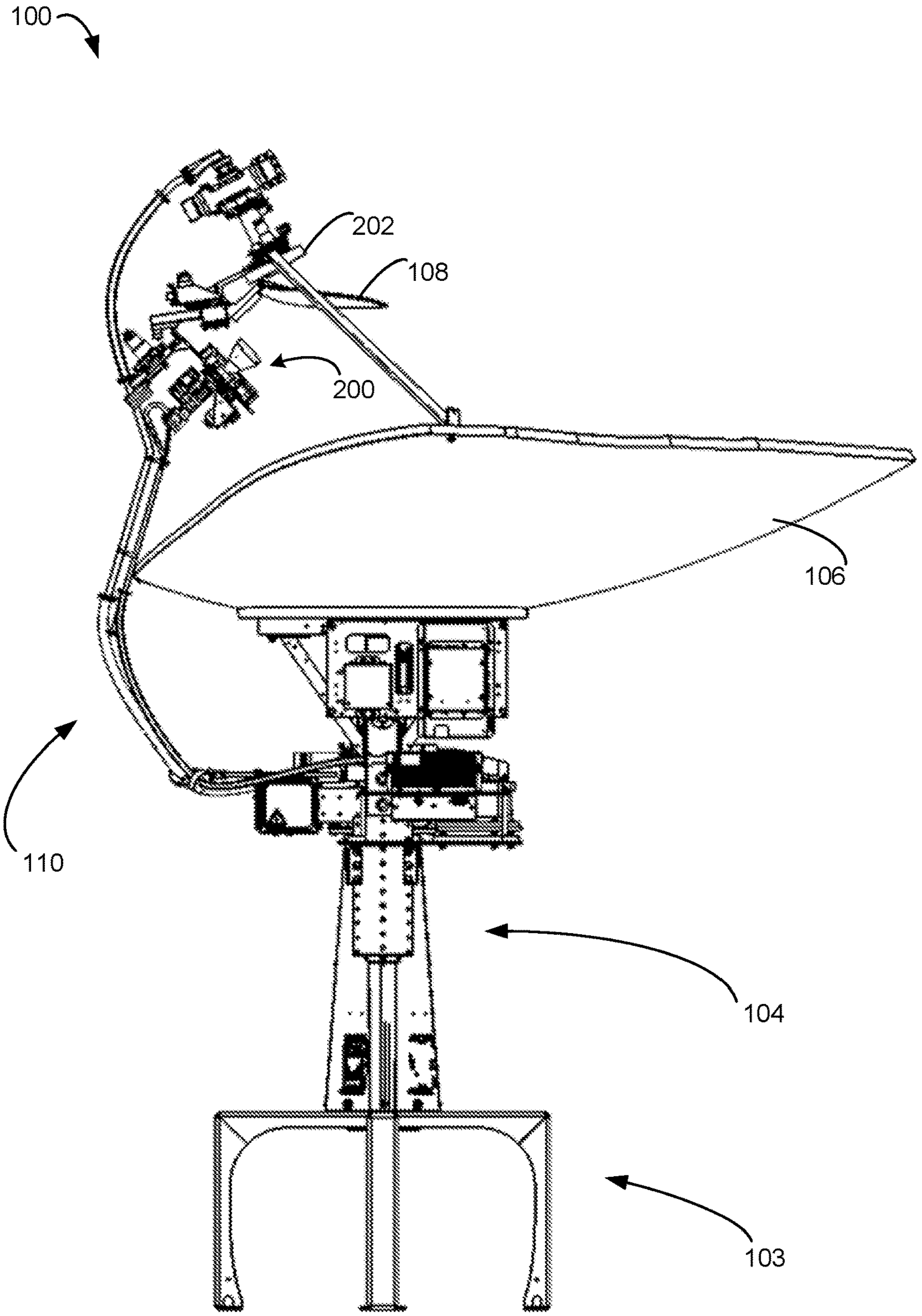
FIG. 2 is a side view of the antenna system shown in FIG. 1, in accordance with some embodiments.

In some embodiments, support assembly 104 and/or support sub-assembly 110 includes supporting structural members, bearings, drive means, etc. for positioning and stabilizing the primary reflector 106, sub-reflector 108, and/or movable feed subsystem 200 (FIG. 2). For example, the positioning and/or stabilizing elements of support assembly 104 and/or support sub-assembly 110 allow antenna system 100 to communicate with one or more satellites (e.g., while a vessel on which the antenna system 100 is located is in motion). In some aspects, the antenna support is similar to those disclosed by U.S. Pat. No. 5,419,521 entitled THREE-AXIS PEDESTAL, U.S. Pat. No. 8,542,156 entitled PEDESTAL FOR TRACKING ANTENNA, U.S. Patent Application Publication No. 2010-0295749 entitled RADOME FOR TRACKING ANTENNA, and U.S. Pat. No. 9,000,995 entitled THREE-AXIS PEDESTAL HAVING MOTION PLATFORM AND PIGGY BACK ASSEMBLIES, the entire content of which patents and publications is incorporated herein for all purposes by this reference, as well as those used in the Sea Tel® 9707, 9711 and 9797 VSAT systems, as well as other satellite communications antennas sold by Cobham SATCOM of Concord, California.

FIG. 2 shows a side view of antenna system 100, in accordance with some embodiments. Antenna system 100 includes movable feed sub-system 200 that is coupled to support sub-assembly 110 of support assembly 104. Movable feed sub-system 200 is described further with regard to FIGS. 6-8. In some embodiments, antenna system 100 includes a stationary or fixed feed 202 that is coupled to support assembly 104.

Figure 3:
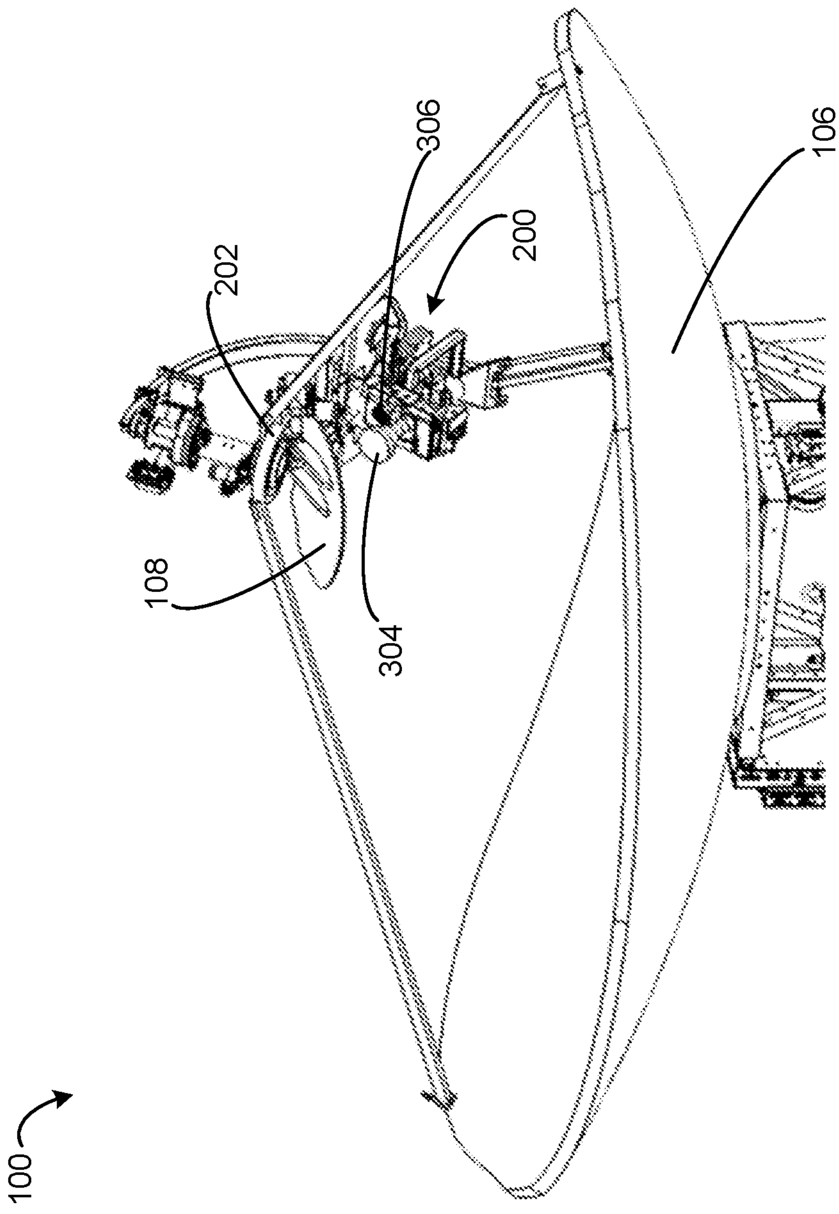
FIGS. 3-4 illustrate movement of the subreflector assembly of the antenna system shown in FIGS. 1 and 2 between a first position and a second position, in accordance with some embodiments.
Figure 4:
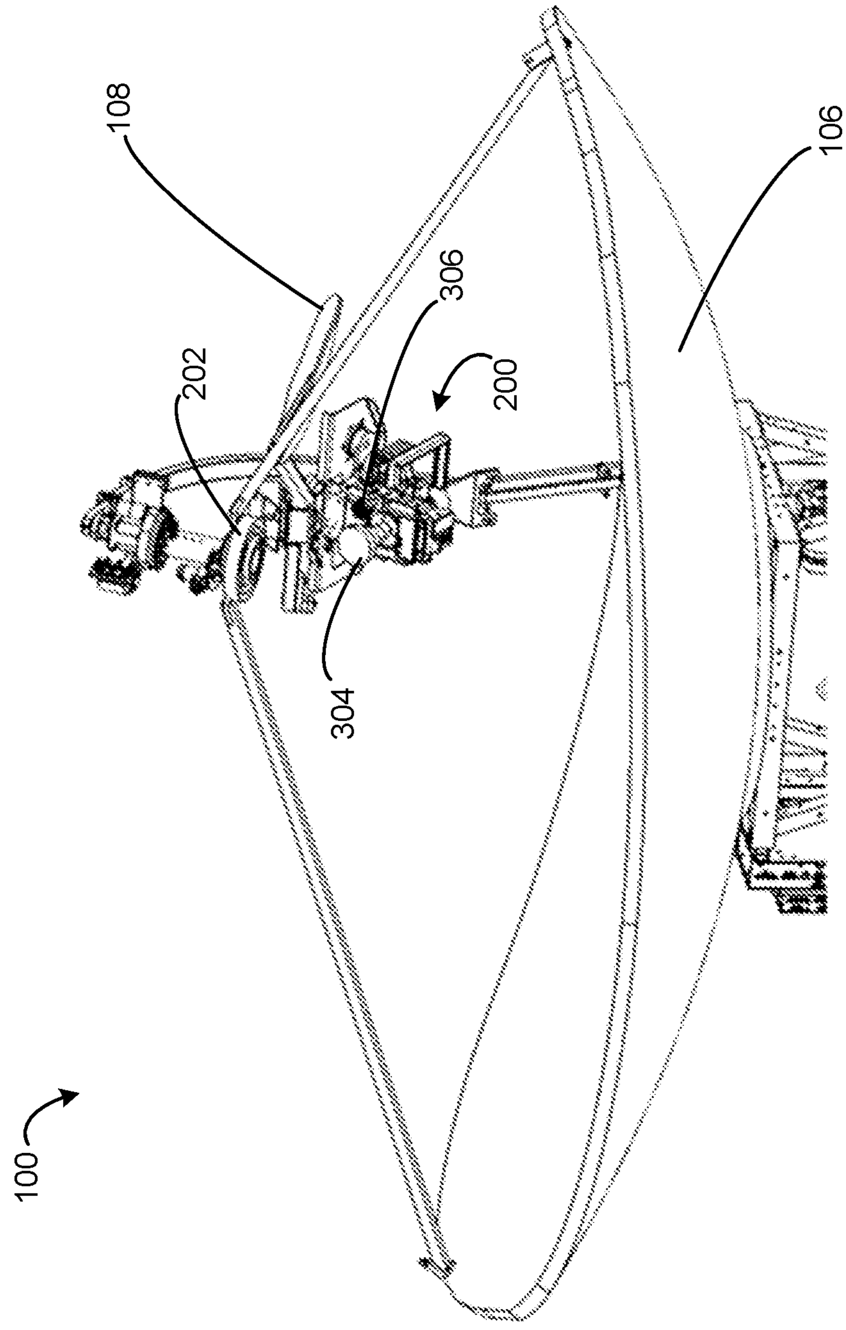

FIGS. 3-4 show an enlarged view of primary reflector 106 and subreflector assembly 108, illustrating movement of subreflector assembly 108 between a first position (as shown in FIG. 3) and a second position (as shown in FIG. 4), in accordance with some embodiments. Movable feed sub-system 200 includes a first movable feed 304 (e.g., a $K_u$ Feed) and a second movable feed 306 (e.g., a $K_a$ feed) (e.g., as shown in FIG. 3).

Figure 11:
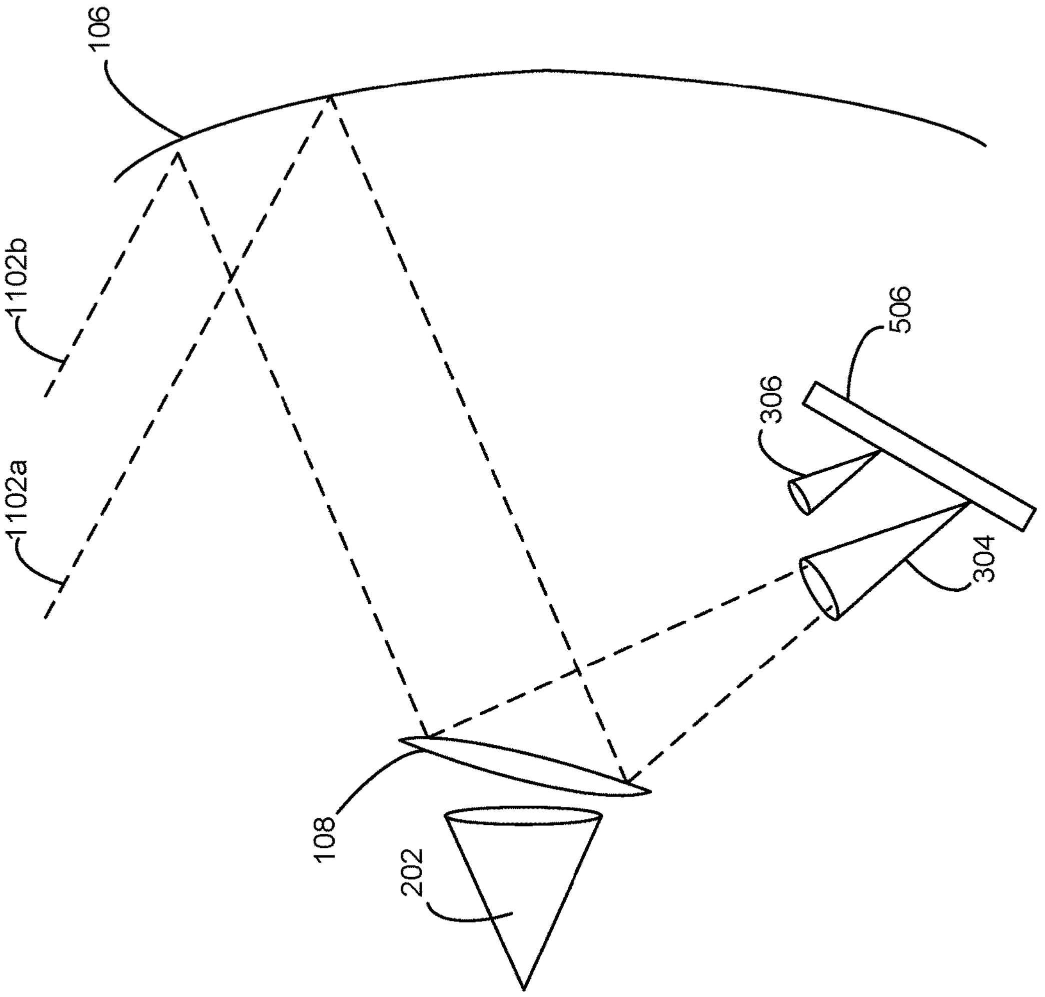
FIG. 11 is a signal path schematic illustrating a signal path between a first movable feed and a primary reflector, in accordance with some embodiments.
Figure 12:
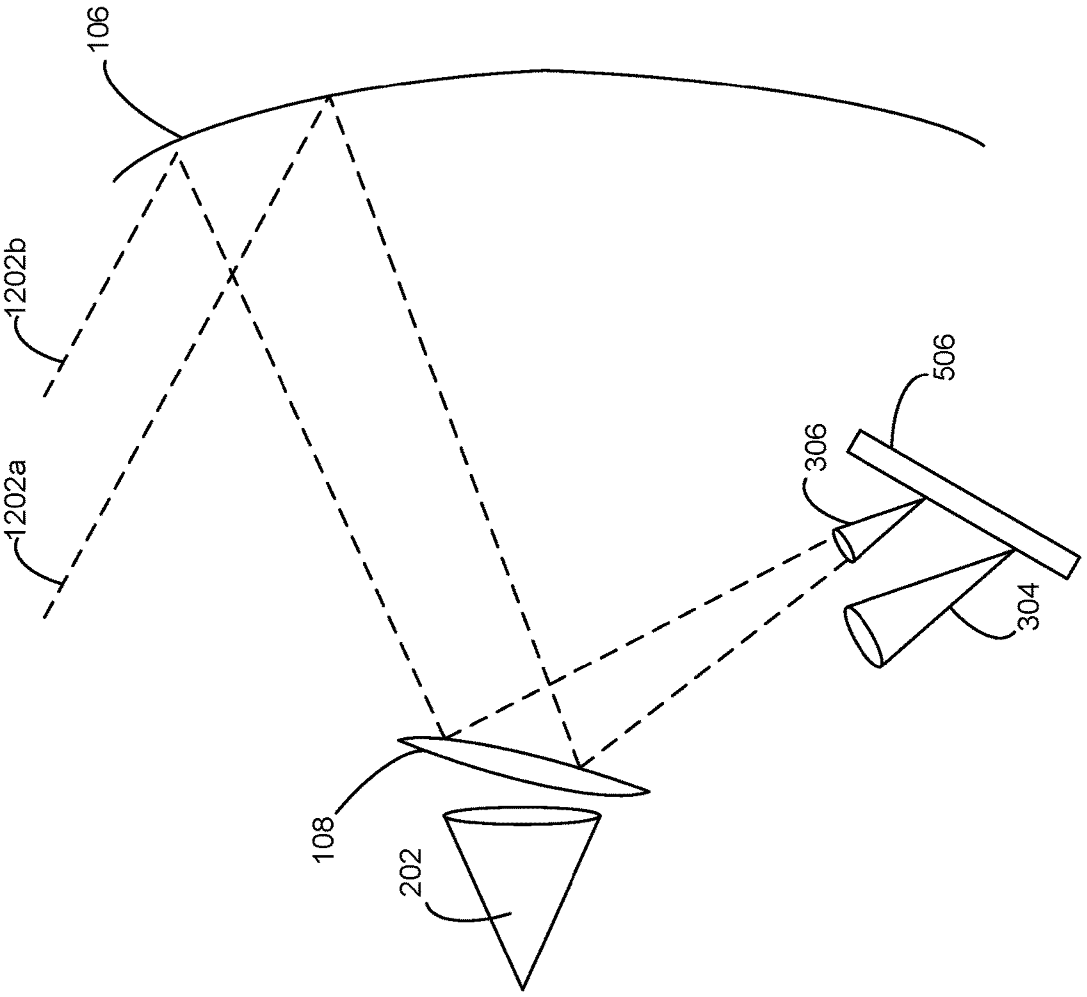
FIG. 12 is a signal path schematic illustrating a signal path between a second movable feed and a primary reflector, in accordance with some embodiments.
Figure 13:
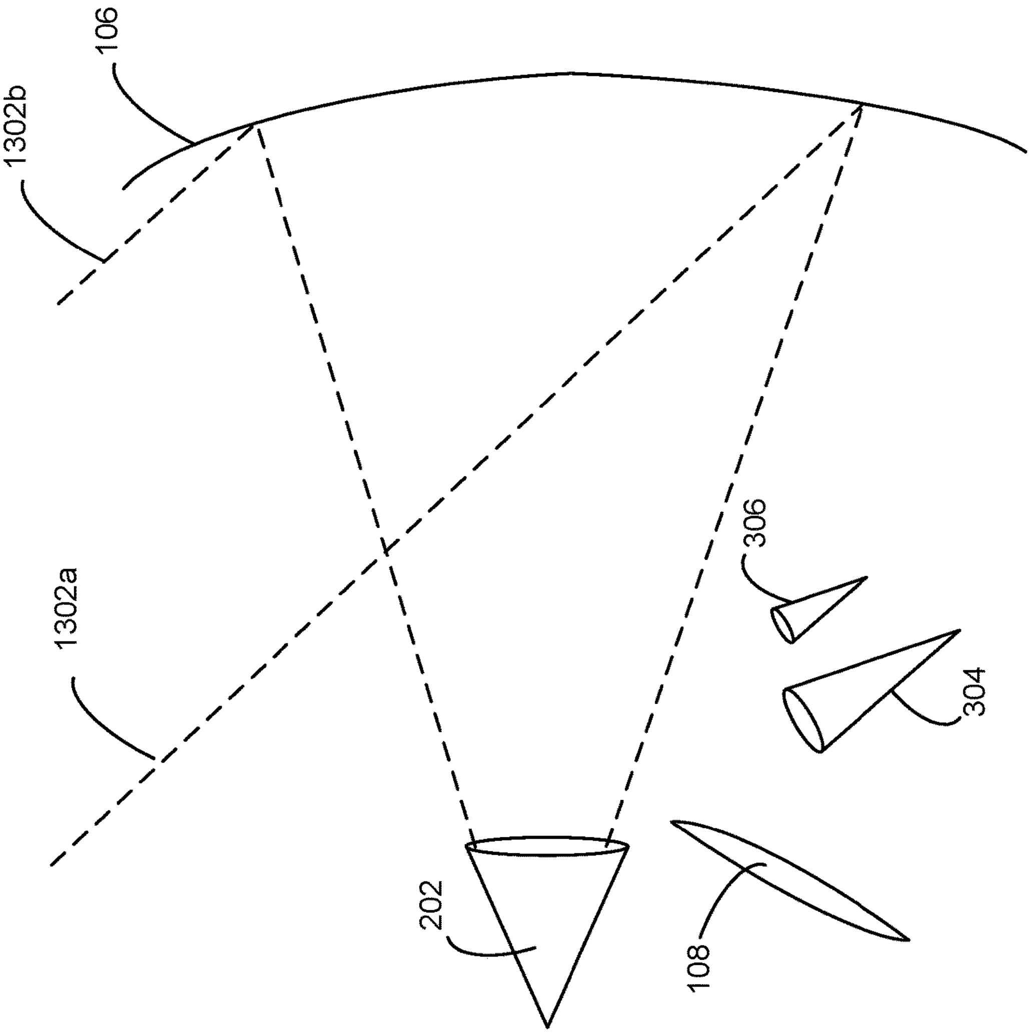
FIG. 13 is a signal path schematic illustrating a signal path between a fixed feed and a primary reflector, in accordance with some embodiments.

As discussed further with regard to FIGS. 11-13, when subreflector assembly 108 is in a first position, as shown in FIG. 3, a path between fixed feed 202 (e.g., a C-band feed) and primary reflector 106 is intercepted by subreflector assembly 108. Signals traveling to and/or from first movable feed 304 and/or second movable feed 306 are deflected by subreflector assembly 108. For example, received signals from a satellite are reflected by primary reflector 106 and by subreflector assembly 108 to arrive at first movable feed 304 and/or second movable feed 306. Signals transmitted by first movable feed 304 and/or second movable feed 306 are reflected by subreflector assembly 108 to primary reflector 106, which directs the transmitted signals toward a satellite.

When subreflector assembly 108 is in a second position, as shown in FIG. 4, a path between fixed feed 202 and primary reflector 106 is not intercepted by subreflector assembly 108. Accordingly, signals travel directly between fixed feed 202 and primary reflector 106. Signals from first movable feed 304 and second movable feed 306 are not reflected by subreflector assembly 108 and are thus not directed to primary reflector 106.

Figure 5:
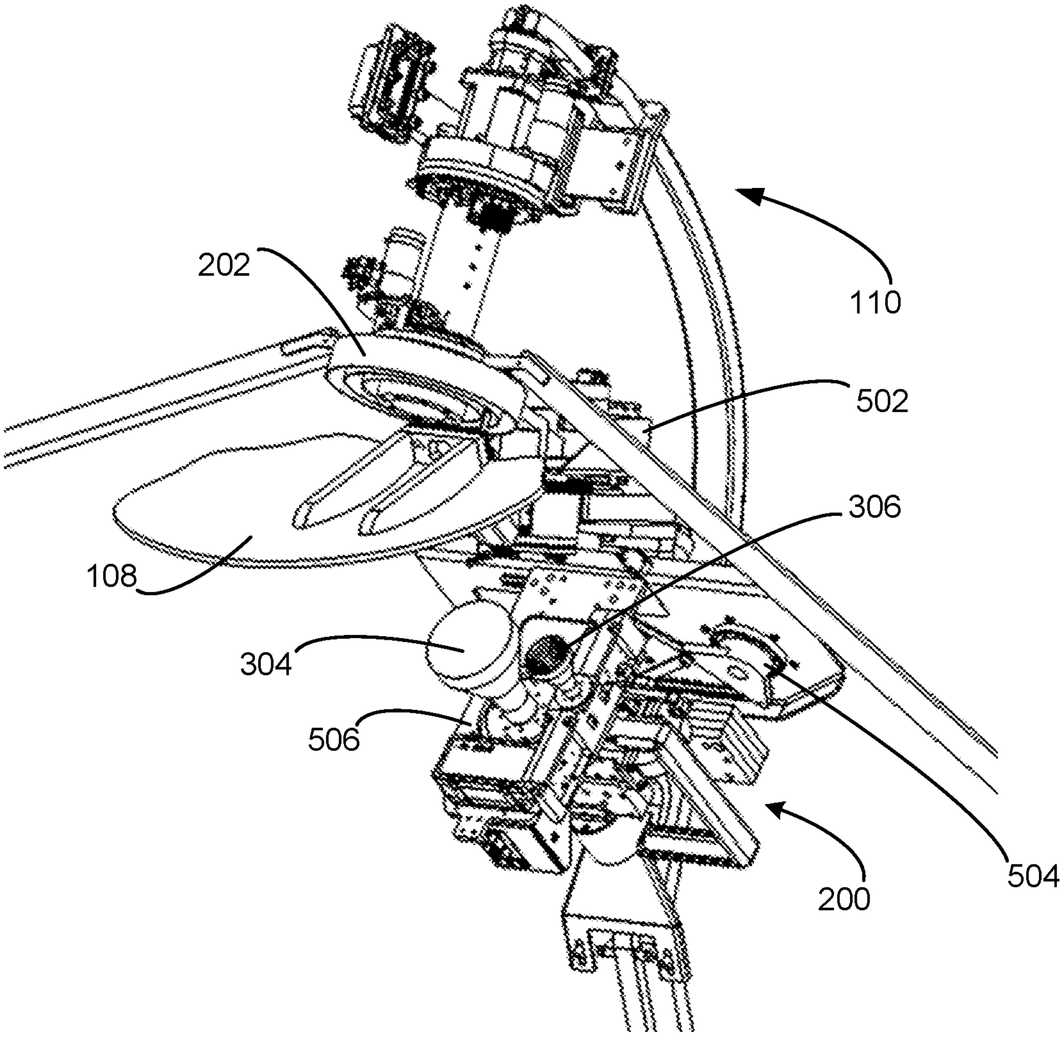
FIG. 5 is an enlarged perspective view of a feed subsystem, a subreflector assembly, and a fixed feed of an antenna system of the antenna system shown in FIGS. 1-4, in accordance with some embodiments.
Figure 6:
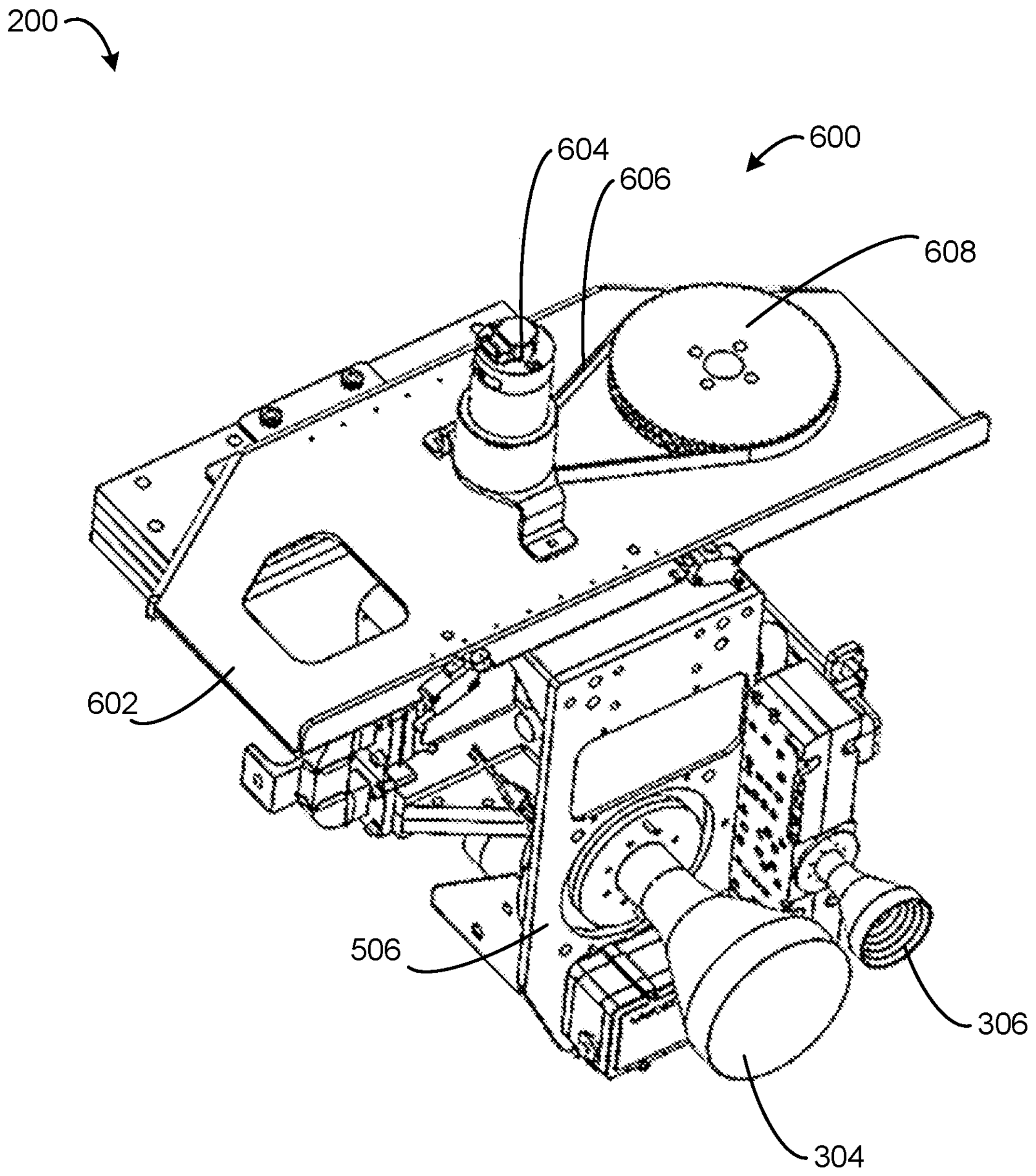
FIG. 6 is a top perspective view of a movable feed sub-system of the antenna system shown in FIGS. 1-5, in accordance with some embodiments
Figure 7:
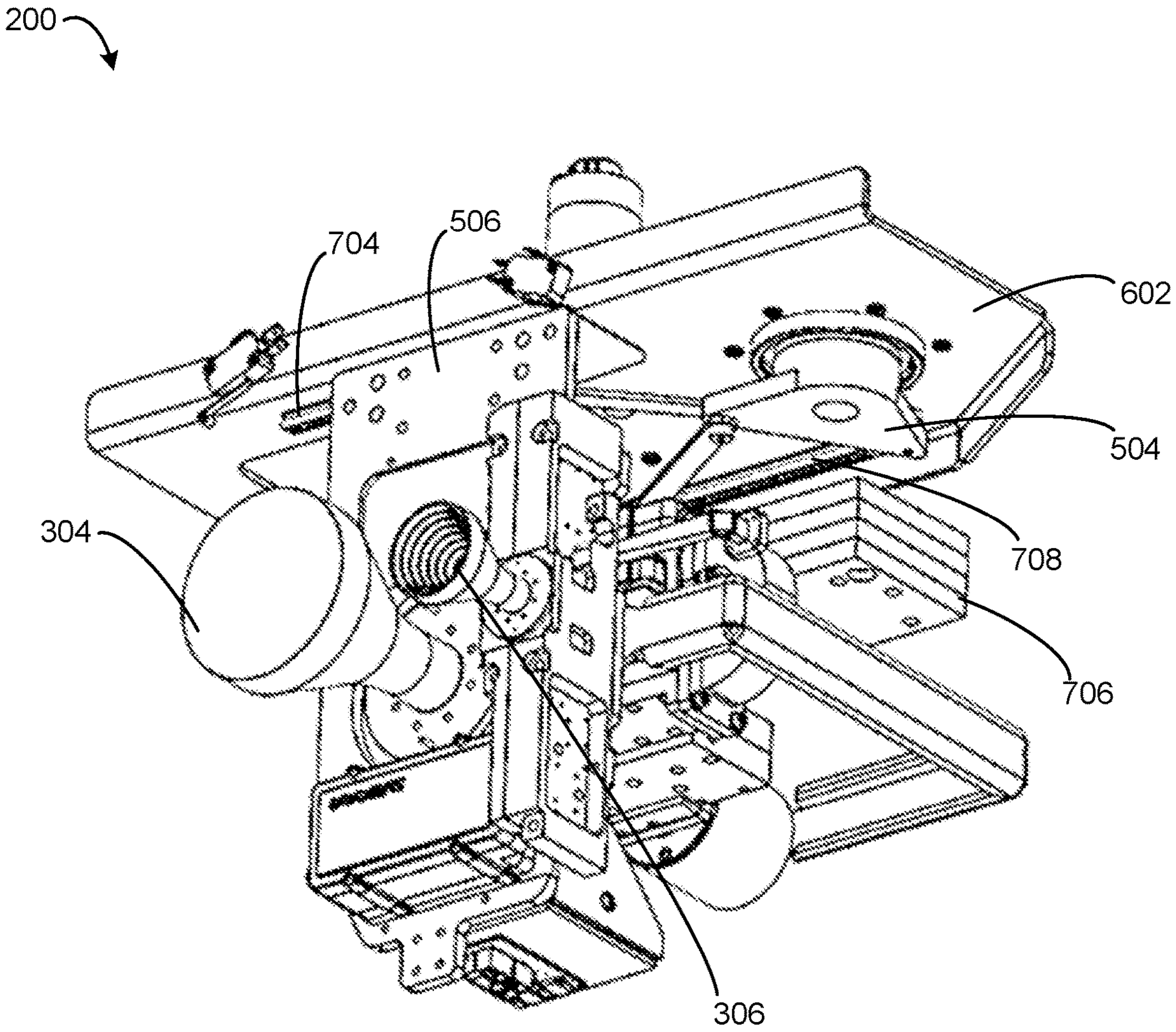
FIGS. 7-8 are bottom perspective views of movable feed sub-system of the antenna system shown FIGS. 1-6, illustrating movement of a movable platform from a first position to a second position, in accordance with some embodiments.
Figure 8:
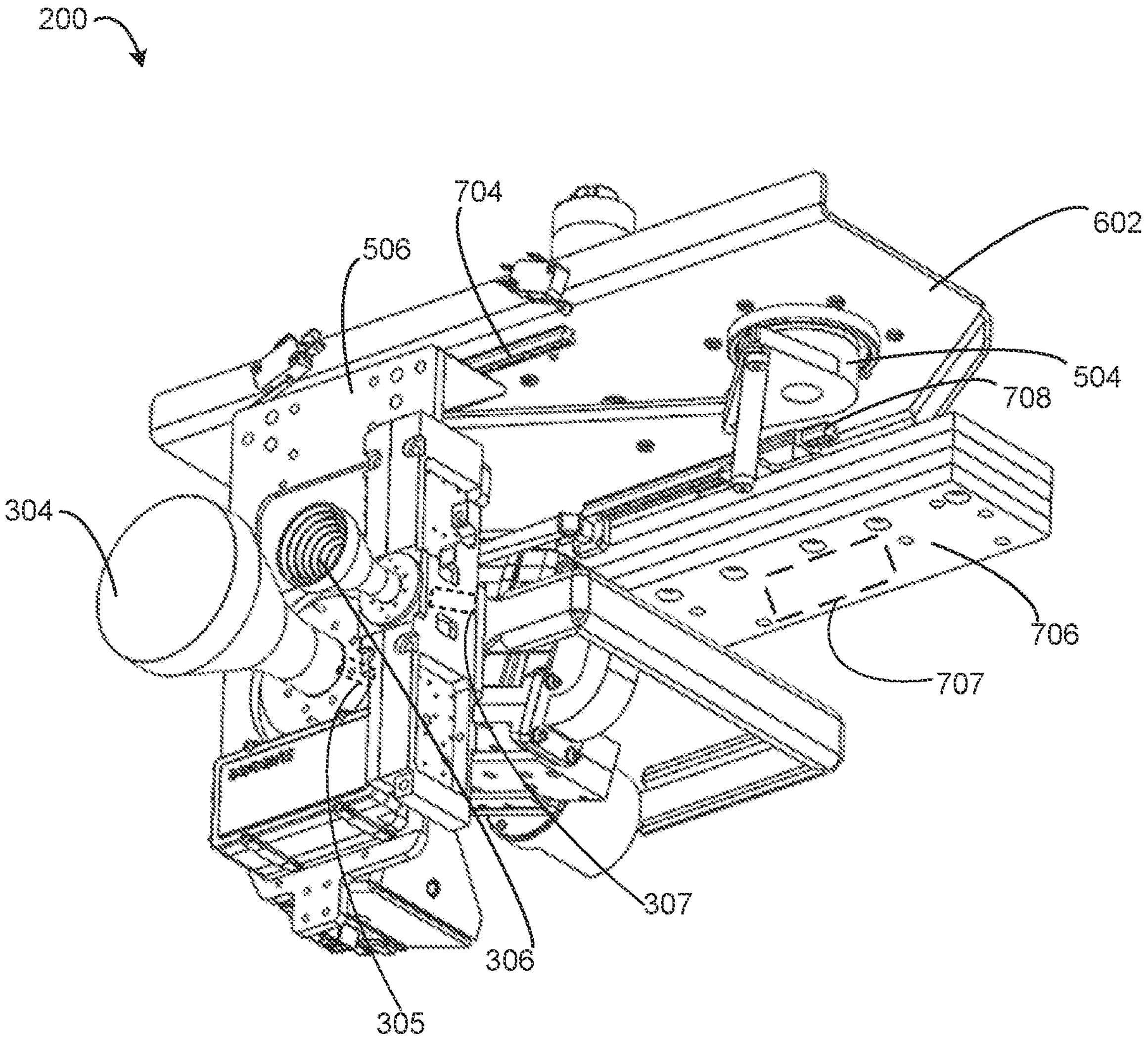

FIG. 5 is an enlarged view of movable feed sub-system 200, subreflector assembly 108, and fixed feed 202 of antenna system 100, in accordance with some embodiments. Subreflector assembly 108 is moved between the first position shown in FIG. 3 and the second position shown in FIG. 4 by an subreflector actuator 502 (e.g., a motor). In some embodiments, subreflector actuator 502 and/or fixed feed 202 are fixedly coupled to support sub-assembly 110 of support assembly 104. Movable feed platform 506, to which first movable feed 304 and second movable feed 306 are mounted, is moved between a first position (e.g., as shown in FIG. 7) and a second position (e.g., as shown in FIG. 8) by rotatable shaft 504 that is coupled to a movable feed actuating system 600 (e.g., as shown in FIG. 6). Because first movable feed 304 and second movable feed 306 are both fixedly mounted to a movable feed platform 506 that is moved by actuating system 600, first movable feed 304 and second movable feed 306 are synchronously movable.

FIG. 6 shows a top perspective view of movable feed sub-system 200, in accordance with some embodiments. Movable feed sub-system 200 includes a movable feed support bracket 602 (e.g., a component of support sub-assembly 110 of support assembly 104) to which movable feed platform 506 is movably coupled. In some embodiments, a movable feed actuating system 600 is coupled to the movable feed support bracket 602. Movable feed actuating system 600 includes a motor 604 that is configured to move a belt 606. The movement of belt 606 causes rotation of a pulley 608 that is coupled to rotatable shaft 504. The rotation of rotatable shaft 504 causes movement of movable feed platform 506 to which first movable feed 304 and second movable feed 306 are mounted. In this way, motor 604 drives rotatable shaft 504.

Figure 14:
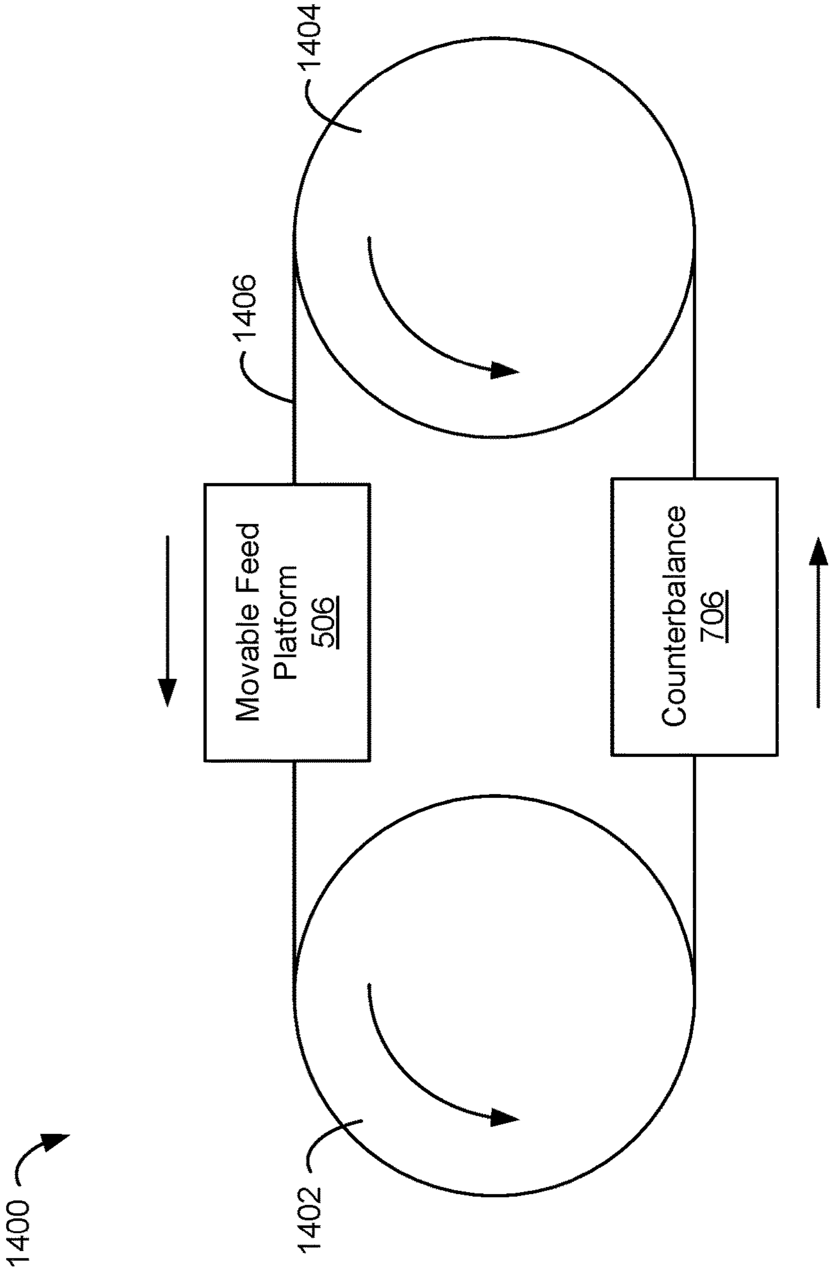
FIG. 14 is a block diagram illustrating an actuating system to cause movement of movable feed platform and a counterbalance, in accordance with some embodiments.

It will be recognized that alternative actuating systems can be used (e.g. in lieu of the movable feed actuating system 600 illustrated in FIG. 6) to cause movement of movable feed platform 506 and/or a counterbalance 706 (described with regard to FIG. 7). In some embodiments, movable feed platform 506 is moved by a first solenoid (not shown). For example, the first solenoid has a base that is coupled to movable feed support bracket 602 and an actuating element that is coupled to the feed platform 506. In some embodiments, counterbalance 706 is moved by a second solenoid (not shown) that is coupled to the counterbalance 706. For example, the second solenoid has a base that is coupled to movable feed support bracket 602 and an actuating element that is coupled to the counterbalance 706. In some embodiments, movable feed platform 506 is moved by a first motor (e.g., motor 602) that is coupled to the movable feed support bracket 602. For example, a motor is coupled directly to a rotatable shaft that is coupled to movable feed platform 506, such that the motor causes rotation of movable feed platform 506. In some embodiments, counterbalance 706 is moved by a second motor (not shown) that is coupled to the movable feed support bracket 602. FIG. 14 illustrates an actuating system that includes two pulleys. FIGS. 15-29 illustrate a movable feed platform that is coupled to a first lead screw that is caused to retract and extend by a first motor and a counterbalance that is coupled to a second lead screw that is caused to retract and extend by a second motor.

FIGS. 7-8 show a bottom perspective view of movable feed sub-system 200, illustrating movement of movable feed platform 506 from a first position (e.g., as shown in FIG. 7) to a second position (as shown in FIG. 8), in accordance with some embodiments. In FIG. 7, rotatable shaft 504 is rotated to a first position, and movable feed platform 506 is at a position on the right side of feed mount track 704.

In some embodiments, movable feed sub-system 200 includes a counterbalance 706 that is configured to move synchronously with movement of the movable feed platform 506 in a direction that is opposite of the direction of motion of the movable feed platform 506. Counterbalance 706 is movably coupled to support bracket 602 (e.g., a component of support sub-assembly 110 of support assembly 104). In FIG. 7, counterbalance 706 is shown at the left end of counterbalance track 708.

In some embodiments, counterbalance 706 includes a block upconverter (BUC) 707. In some embodiments, the BUC 707 is configured to convert signals generated by a signal generator to a first frequency band (e.g., the $K_u$-band) for transmission by the first movable feed 304. In some embodiments, the BUC 707 is configured to convert signals generated by the signal generator (or a different signal generator) to the second frequency band (e.g., the $K_a$-band) for transmission by the second movable feed 306. In some embodiments, the BUC 707 converts signals generated by the signal generator to a third frequency band (e.g., the C-band) and/or to additional frequency bands of the plurality of frequency bands reflected by the primary reflector 106.

In FIG. 8, rotatable shaft 504 is rotated to a second position, movable feed platform 506 is at a position on the left side of feed mount track 704, and counterbalance 706 is shown at the right end of counterbalance track 708.

Figure 9:
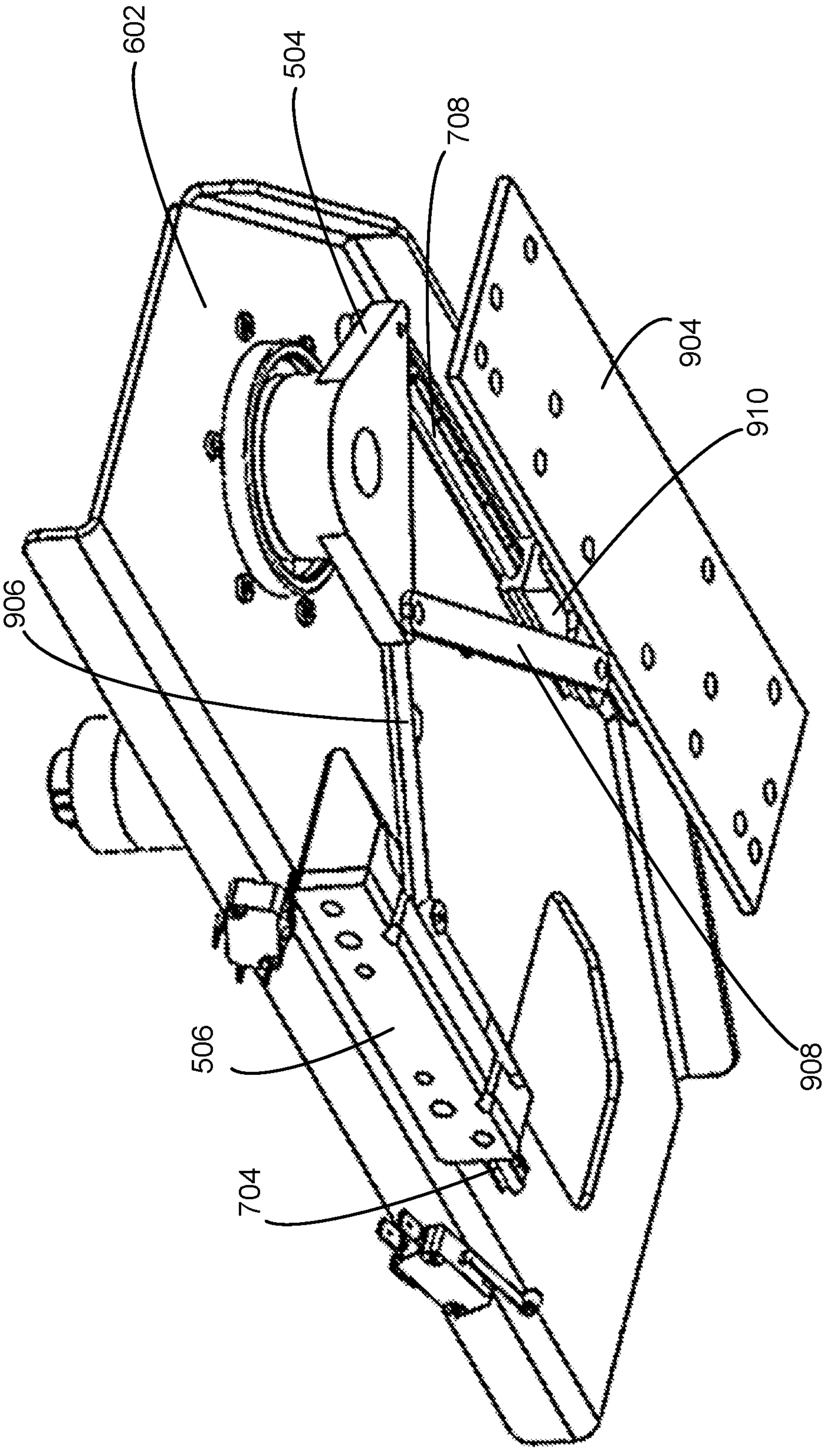
FIGS. 9-10 are bottom perspective views of a movable feed support bracket of a movable feed sub-system of the antenna system shown in FIGS. 1-8, illustrating movement of a movable feed platform from a first position to a second position, in accordance with some embodiments.
Figure 10:
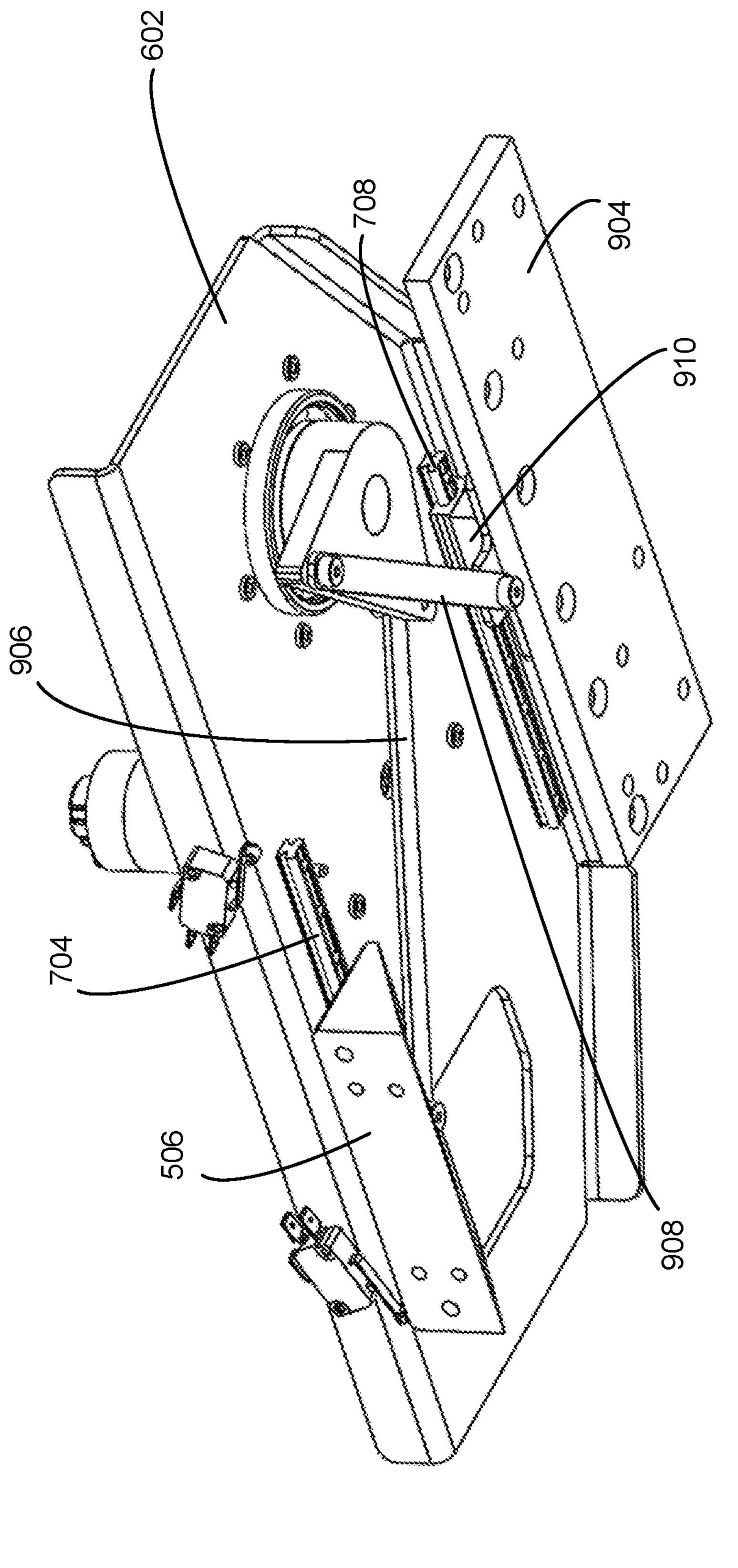

FIGS. 9-10 show a bottom perspective view of movable feed support bracket 602 of movable feed sub-system 200 (shown with a partial view of movable feed platform 506 and shown with counterbalance 706 removed for illustration purposes), illustrating movement of movable feed platform 506 from a first position (e.g., as shown in FIG. 9) to a second position (as shown in FIG. 10), in accordance with some embodiments.

A first connector assembly, such as counterbalance arm 908, is coupled to rotatable shaft 504 and to a counterbalance bearing 910 that slides along counterbalance track 708 (e.g., as illustrated in FIGS. 9-10). The counterbalance bearing 910 is coupled to counterbalance bracket 904 (to which counterbalance 706, not shown in FIG. 9, is mounted). As rotation of rotatable shaft 504 causes movement of counterbalance arm 908, counterbalance bearing 910, counterbalance bracket 904, and counterbalance 706 move along counterbalance track 708.

A second connector assembly, such as feed mount arm 906, is coupled to rotatable shaft 504 and to a feed mount bearing (not shown) that slides along feed mount track 704. The feed mount bearing is coupled to movable feed platform 506. As rotation of rotatable shaft 504 causes movement of feed mount arm 906, the feed mount bearing and movable feed platform 506 move along feed mount track 704. Typically, the movement of movable feed platform 506 is opposite in direction and equal in magnitude to the movement of counterbalance 706 along counterbalance track 708.

In some embodiments, movement of movable feed platform 506 and/or counterbalance 706 (e.g., relative to movable feed support bracket 602) is along a linear path. For example, the movable feed platform 506 moves along a linear path (e.g., along feed mount track 704) between the first feed platform position shown in FIG. 9 and the second feed platform position shown in FIG. 10.

In some embodiments, movement of movable feed platform 506 and/or counterbalance 706 is along a rotational path between a first feed platform position and a second feed platform position. For example, the movable feed platform 506 is directly coupled to a motor that is configured to rotate the movable feed platform 506. In some embodiments, a second motor drives counterbalance 706 in a direction that is opposite to the motion of the movable feed platform 506.

In some embodiments, one or more mechanical stops (e.g., pins) and/or limit switches are utilized to limit movement of movable feed platform 506 and/or counterbalance 706 (e.g., movement beyond the first position and/or the second position). For example, pins mounted to support bracket 602 restrain motion of feed platform 506 and/or counterbalance 706.

In some embodiments, a first rubberized waveguide 305 is coupled to the first movable feed 304 and configured to channel the first RF signal received from and/or transmitted to the first movable feed 304. In some embodiments, a second rubberized waveguide 307 is coupled to the second movable feed 306 and configured to channel the second RF signal received from and/or transmitted to the second movable feed 306. The flexibility of the rubberized waveguides advantageously accommodates the motion of the movable feed platform 506.

In FIGS. 11-12, subreflector assembly 108 is in a first subreflector position in which the subreflector assembly 108 intersects a signal path of RF signal 1102 and RF signal 1202. Signals travel along the signal path in a reception path direction (e.g., from a satellite to a feed) and/or in a transmission path direction (e.g., from a feed to a satellite)

FIG. 11 is a signal path diagram illustrating a signal path between a first movable feed 304 and primary reflector 106, in accordance with some embodiments. In FIG. 11, a movable feed platform 506 is in a first position (e.g., as illustrated in FIGS. 7 and/or 9). Along a reception path, RF signals 1102 (e.g., 1102*a*, 1102*b*) travel from a satellite (not shown) and are reflected by primary reflector 106 to subreflector assembly 108, which in turn reflects the RF signals 1102 to first movable feed 304. In some embodiments, when the movable feed platform 506 is in the first movable feed platform position, the second movable feed 306 does not receive the RF signal 1102 (or any other RF signal). Along a transmission path, signals transmitted from first movable feed 304 are reflected by subreflector assembly 108 toward primary reflector 106, which in turn reflects the RF signals 1102 to the satellite.

FIG. 12 is a signal path diagram illustrating a signal path between a second movable feed 306 and primary reflector 106, in accordance with some embodiments. In FIG. 12, a movable feed platform 506 is in a second position (e.g., as illustrated in FIGS. 8 and/or 10). Along a reception path, RF signals 1202 (e.g., 1202*a*, 1202*b*) travel from a satellite (not shown) and are reflected by primary reflector 106 to subreflector assembly 108, which in turn reflects the RF signals 1202 to second movable feed 306. In some embodiments, when the movable feed platform 506 is in the second movable feed platform position, the first movable feed 304 does not receive the RF signal 1202 (or any other RF signal). Along a transmission path, signals transmitted from second movable feed 306 are reflected by subreflector assembly 108 toward primary reflector 106, which in turn reflects the RF signals 1202 to the satellite.

Figure 20:
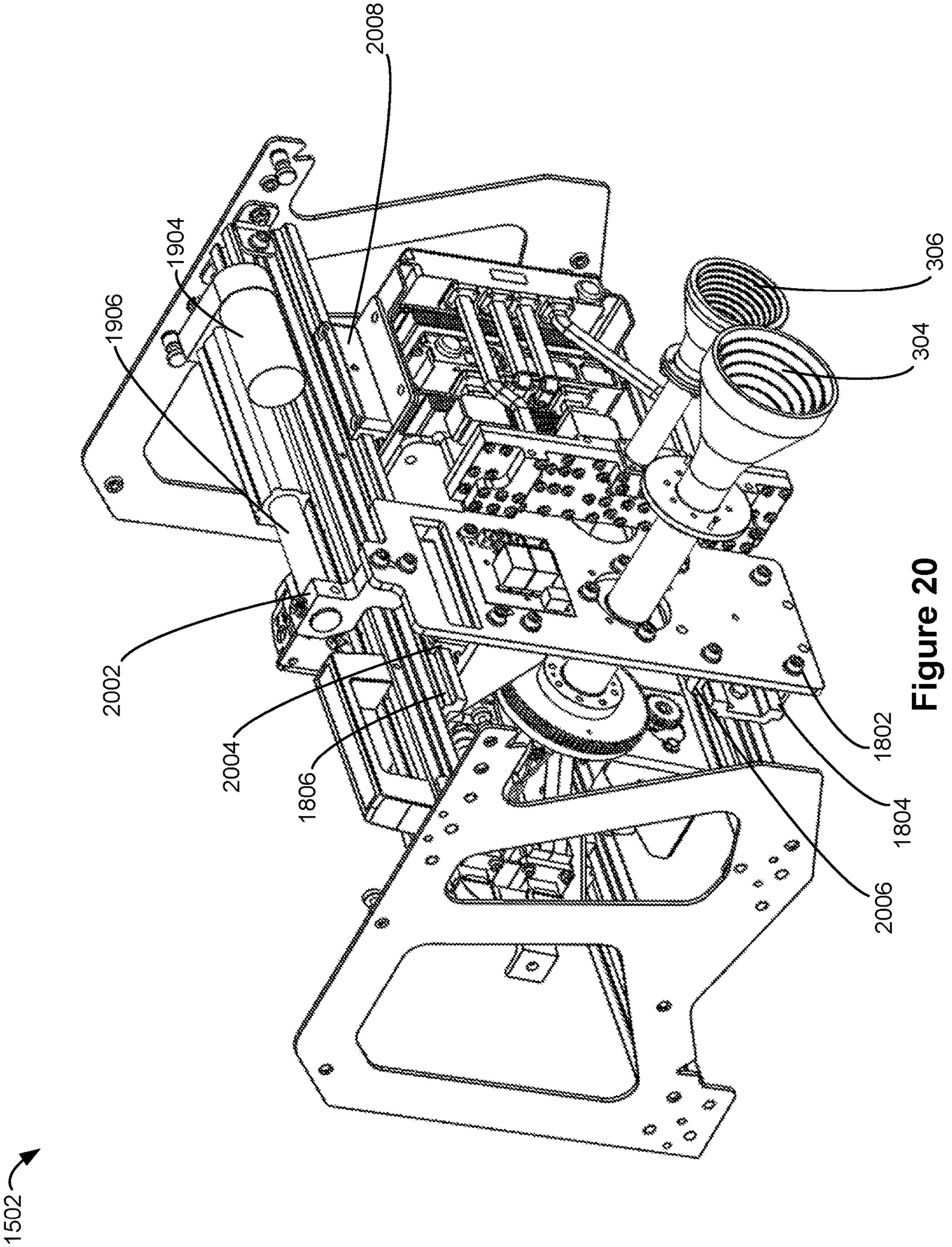
FIGS. 20-21 are enlarged front perspective views of a movable feed sub-system that illustrate movement of a movable feed assembly between a first position and a second position, in accordance with some embodiments.
Figure 21:
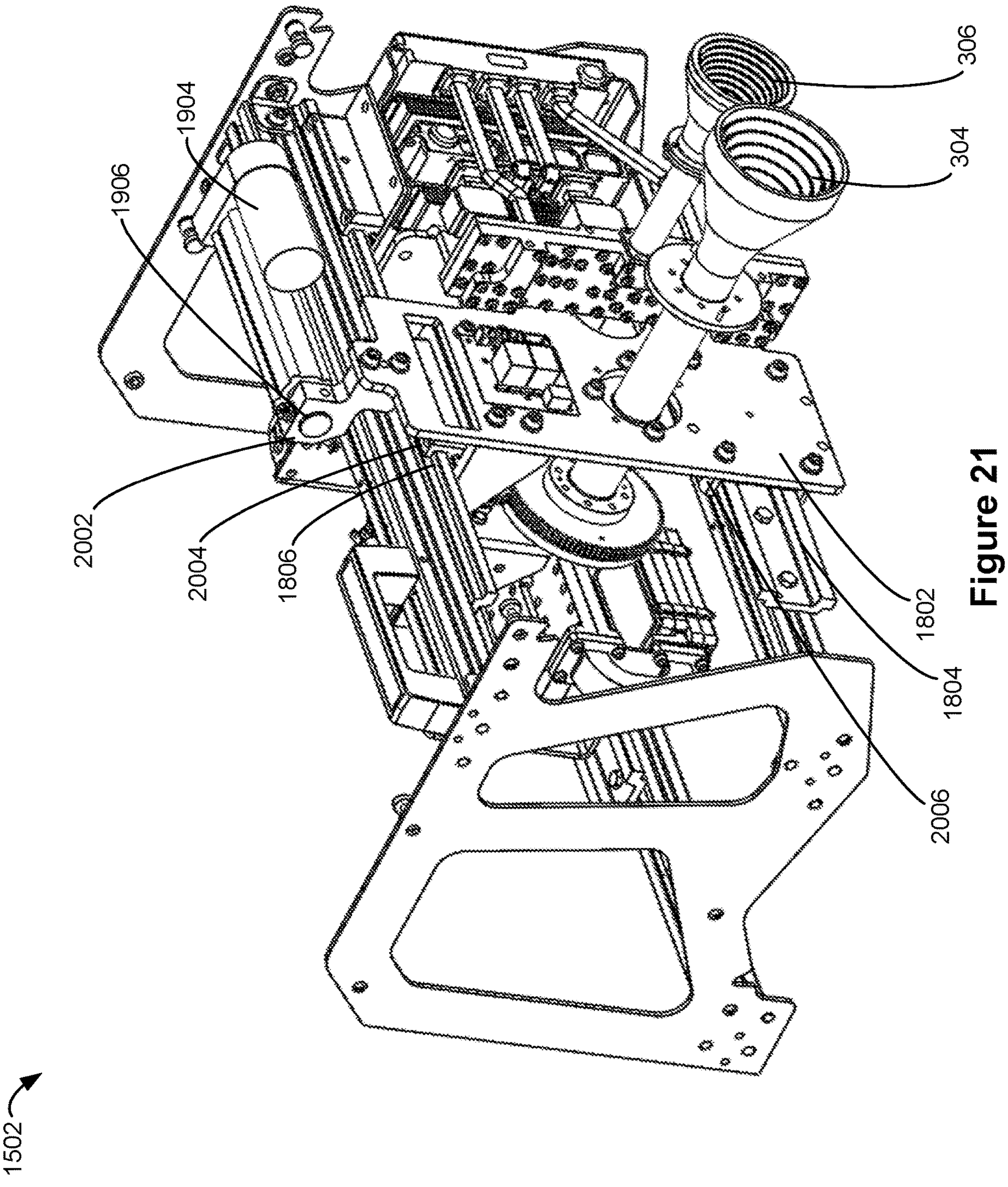

FIGS. 11-12 are also applicable to the movement of movable feed assembly 1802 from a first position (e.g., as illustrated in FIG. 20) to a second position (e.g., as illustrated in FIG. 21).

In FIG. 13, subreflector assembly 108 is in a second subreflector position in which the subreflector assembly 108 does not intersect a signal path of RF signal 1302.

FIG. 13 is a signal path diagram illustrating a signal path between fixed feed 202 and primary reflector 106, in accordance with some embodiments. In FIG. 13, subreflector assembly 108 has moved from the first position shown in FIGS. 11-12 to the second position shown in FIG. 13 (e.g., as illustrated in FIGS. 3-4). Along a reception path, RF signals 1302 (e.g., 1302*a*, 1302*b*) travel from a satellite (not shown) and are reflected by primary reflector 106 to fixed feed 202. Along a transmission path, signals transmitted from fixed feed 202 are reflected by primary reflector 106 to the satellite.

Figure 16:
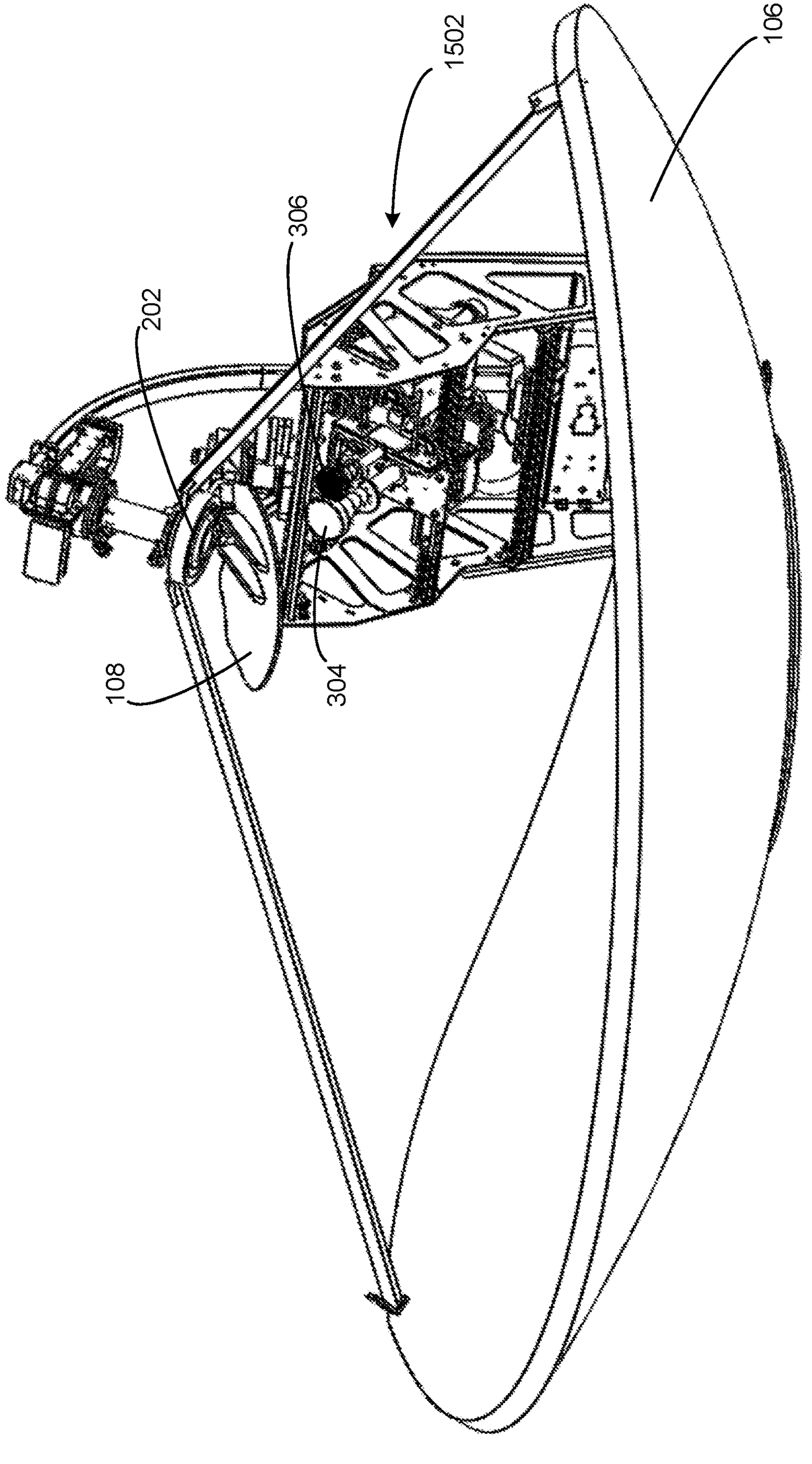
FIGS. 16-17 illustrate movement of the subreflector assembly of the antenna system shown in FIG. 15 between a first position and a second position, in accordance with some embodiments.
Figure 17:
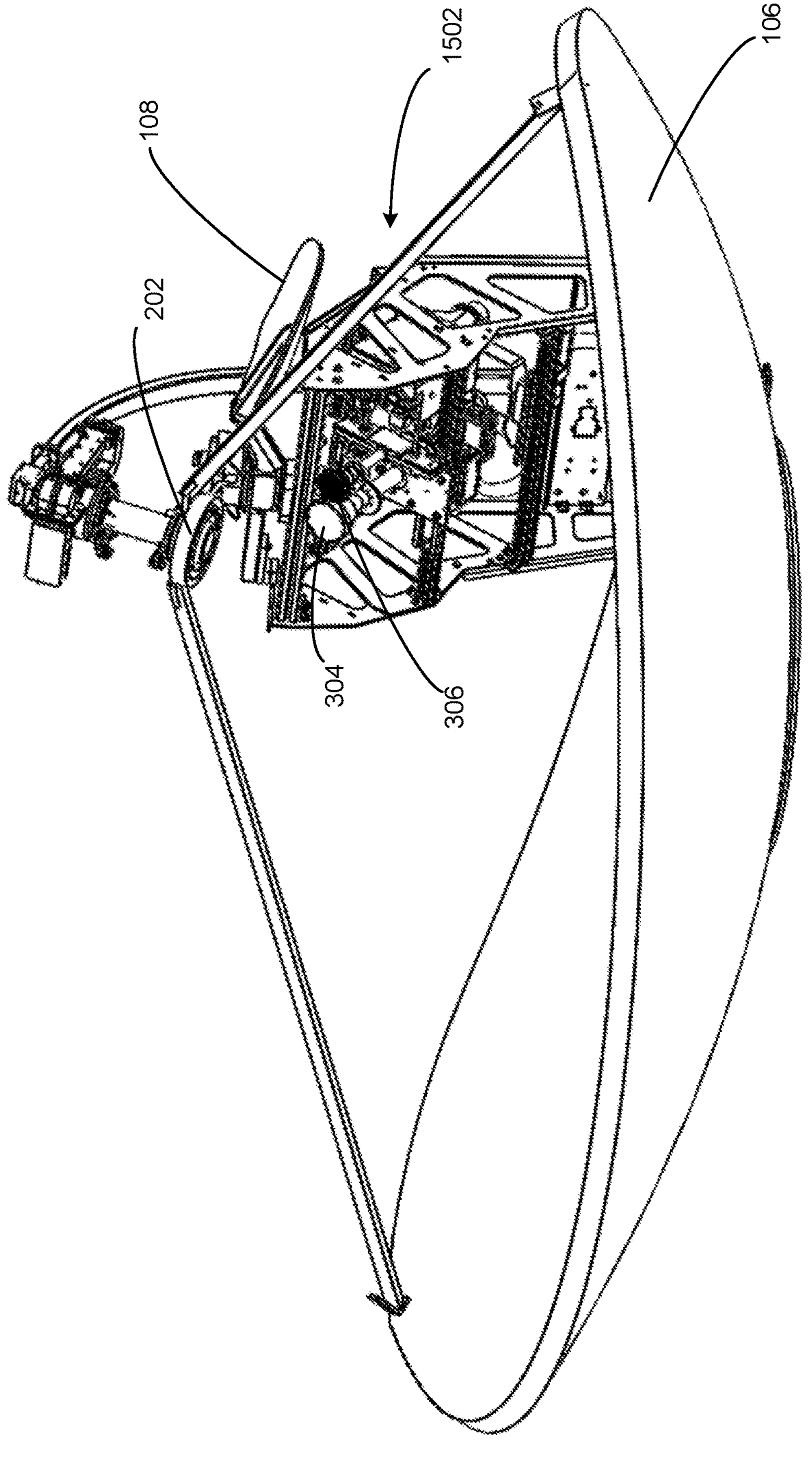

FIG. 13 is also applicable to the movement of subreflector assembly 108 from a first subreflector position as illustrated in FIG. 16 to a second subreflector position as illustrated in FIG. 17.

FIG. 14 illustrates an actuating system to cause movement of movable feed platform 506 and counterbalance 706, in accordance with some embodiments. An actuator (not shown) causes movement of belt 1406, which in turn causes rotation of a first pulley 1402 and a second pulley 1404. (In some embodiments, one or more actuators (not shown) causes movement of first pulley 1402 and/or second pulley 1404). Movable feed platform 506 is coupled to a first segment of belt 1406, such that movement of belt 1406 causes movement of movable feed platform 506 in a first direction. Counterbalance 706 is coupled to a second segment of belt 1406, such that movement of belt 1406 causes movement of counterbalance 706 in a second direction that is opposite the first direction. For example, the first segment of belt 1406 is between first pulley 1402 and second pulley 1404 on a first side of first pulley 1402 and second pulley 1404 and the second segment of belt 1406 is between first pulley 1402 and second pulley 1404 on a second side of first pulley 1402 and second pulley 1404 that is opposite the first side of first pulley 1402 and second pulley 1404.

Figure 29:
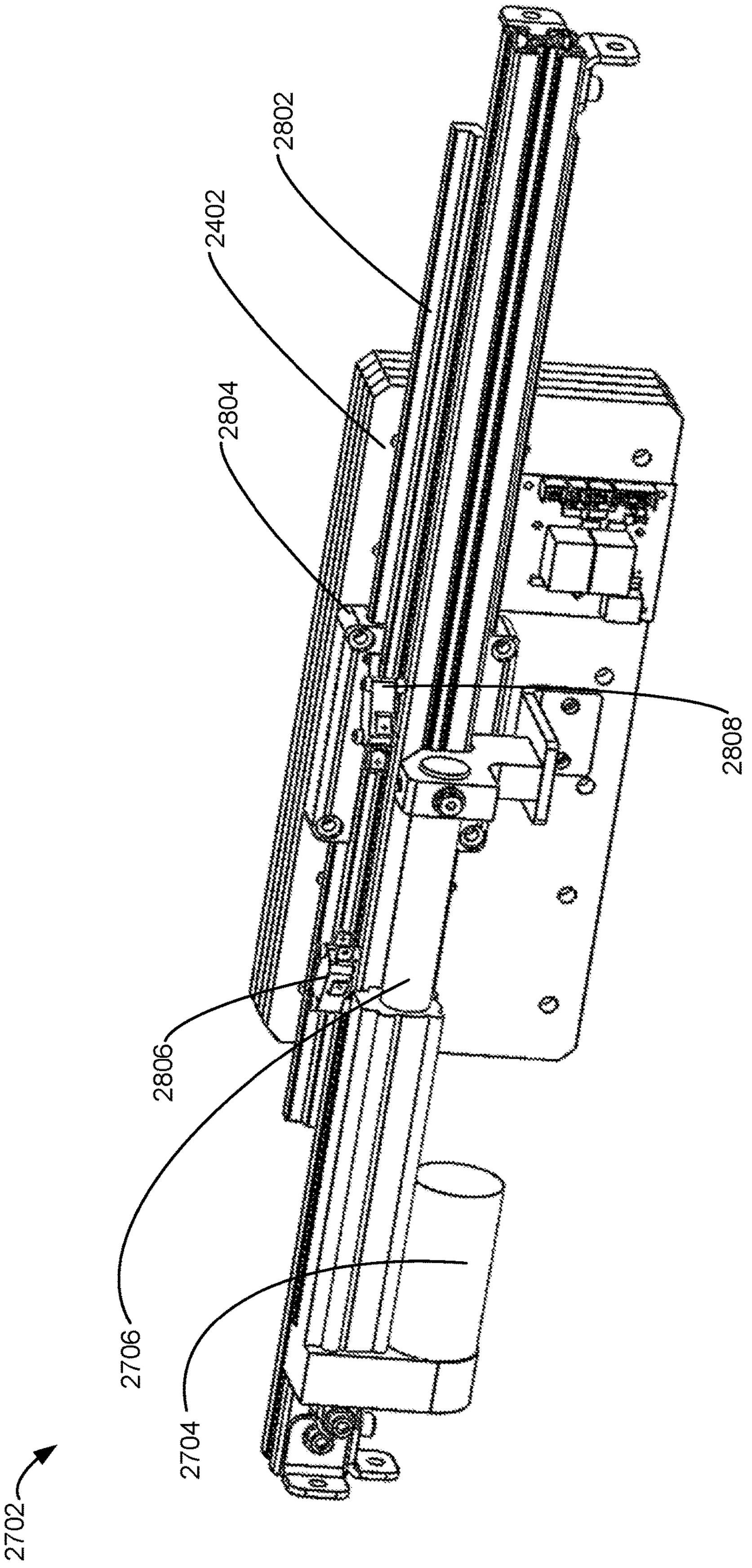
Figure 30:
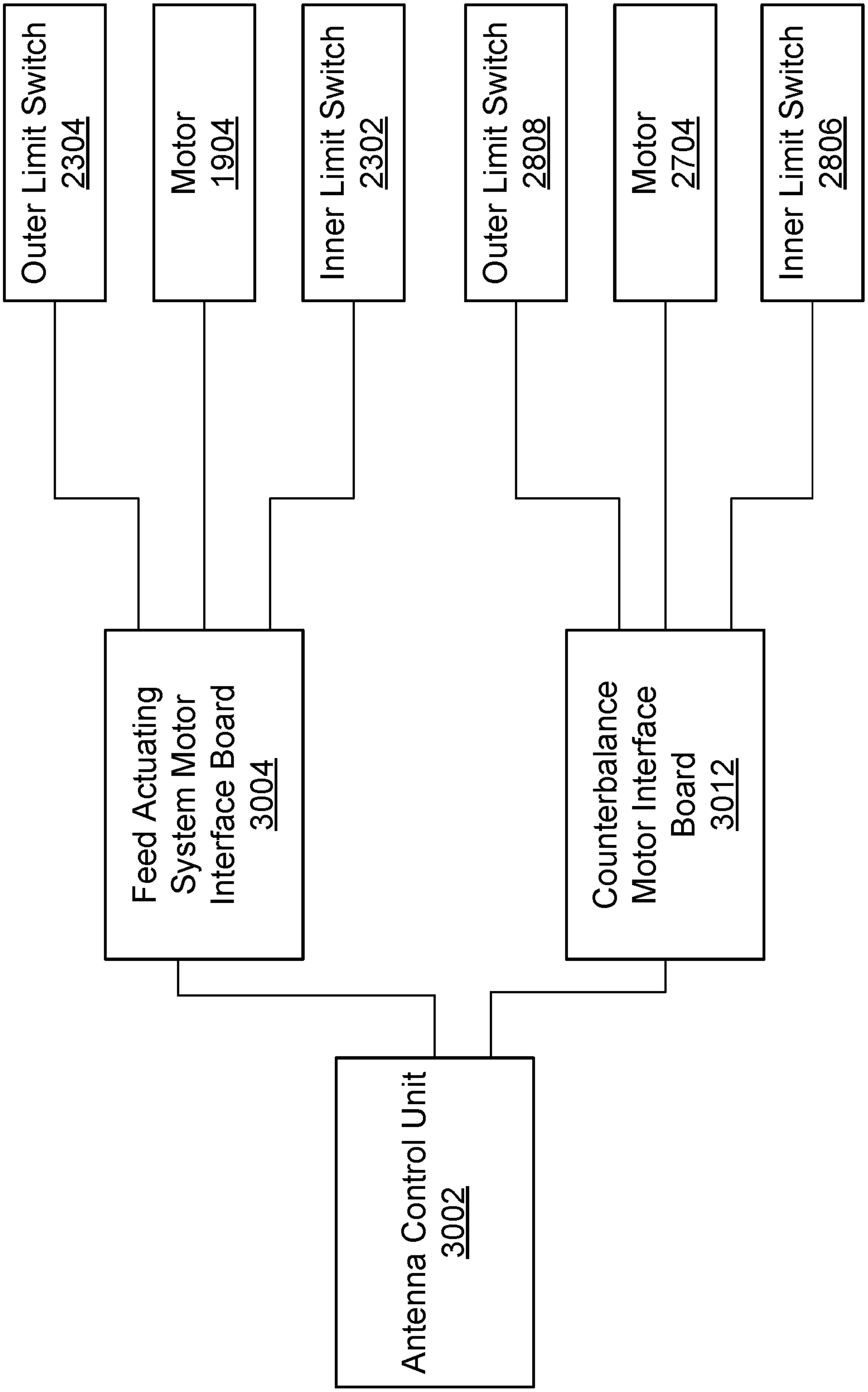
FIG. 30 is a system diagram of an antenna control unit, in accordance with some embodiments.
Figure 31:
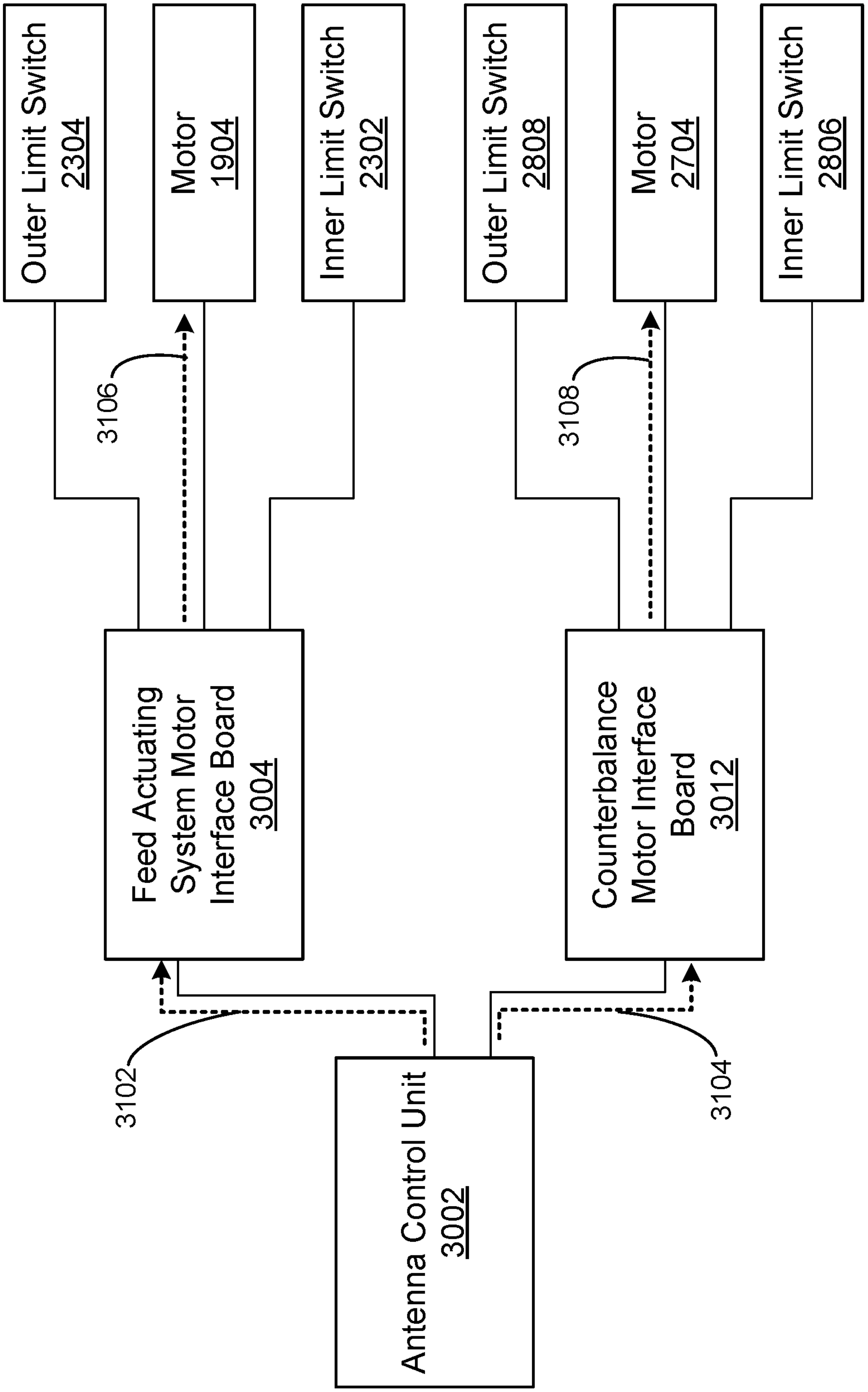
FIG. 31 illustrates parallel operation of a feed assembly motor and a counterbalance motor, in accordance with some embodiments.

In some embodiments, the feed platform is moved between a first feed platform position and a second feed platform position by a first linear actuator. In some embodiments, a counterbalance is moved between a first counterbalance position and a second counterbalance position by a second linear actuator. FIGS. 15-23 illustrate a movable feed subsystem that includes a linear actuator. FIGS. 24-29 illustrate a counterbalance sub-system that includes a linear actuator for moving a counterbalance. FIGS. 30-32 illustrate a control system for controlling motion of a movable feed sub-system and a counterbalance sub-system.

Figure 15:
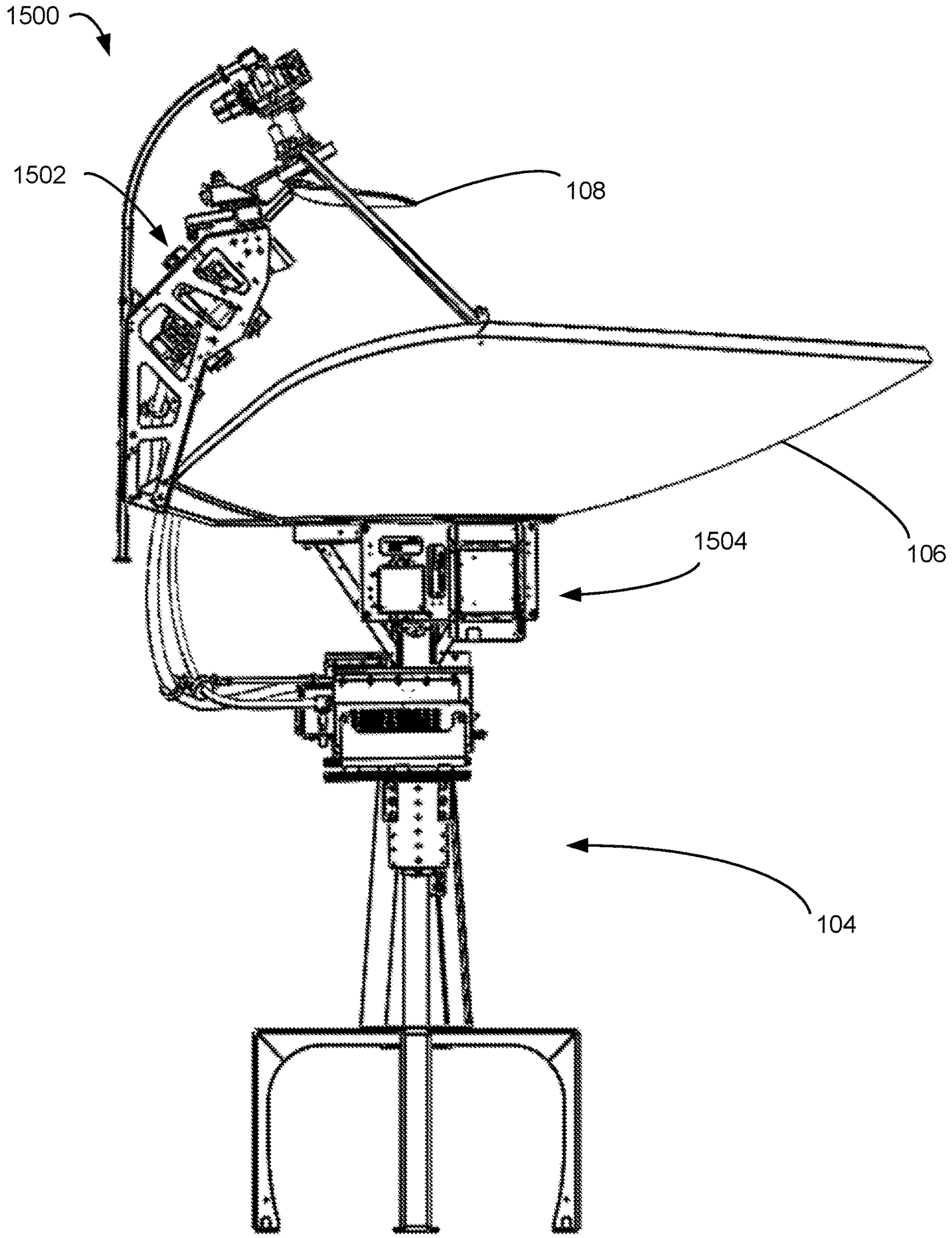
FIG. 15 is side view of an antenna system for receiving signals having radio frequencies in a plurality of radio frequency (RF) frequency ranges, in accordance with some embodiments.

FIG. 15 shows a side view of an antenna system 1500 for receiving signals having radio frequencies in a plurality of radio frequency (RF) frequency ranges, in accordance with some embodiments. Antenna system 1500 includes a movable feed sub-system 1502 that includes a first linear actuator for moving a feed platform and a counterbalance subsystem 1504 that includes a second linear actuator for moving a counterbalance. Movable feed sub-system 1502 includes a first movable feed 304 (e.g., a $K_u$ Feed) and a second movable feed 306 (e.g., a $K_a$ feed). Support assembly 104, primary reflector 106, and subreflector assembly 108 of antenna system 1500 are as described above with regard to antenna system 100.

FIGS. 16-17 show an enlarged perspective view of primary reflector 106, subreflector assembly 108, and movable feed sub-system 1502, illustrating movement of subreflector assembly 108 between a first position (as shown in FIG. 16) and a second position (as shown in FIG. 17), in accordance with some embodiments. As discussed further with regard to FIGS. 11-13, when subreflector assembly 108 is in a first position, as shown in FIG. 16, a path between fixed feed 202 (e.g., a C-band feed) and primary reflector 106 is intercepted by subreflector assembly 108. Accordingly, in FIG. 16, signals traveling to and/or from first movable feed 304 and/or second movable feed 306 are deflected by subreflector assembly 108. When subreflector assembly 108 is in a second position, as shown in FIG. 17, a path between fixed feed 202 and primary reflector 106 is not intercepted by subreflector assembly 108. Accordingly, signals travel directly between fixed feed 202 and primary reflector 106. In FIG. 17, signals from first movable feed 304 and second movable feed 306 are not reflected by subreflector assembly 108 and are thus not directed to primary reflector 106.

Figure 18:
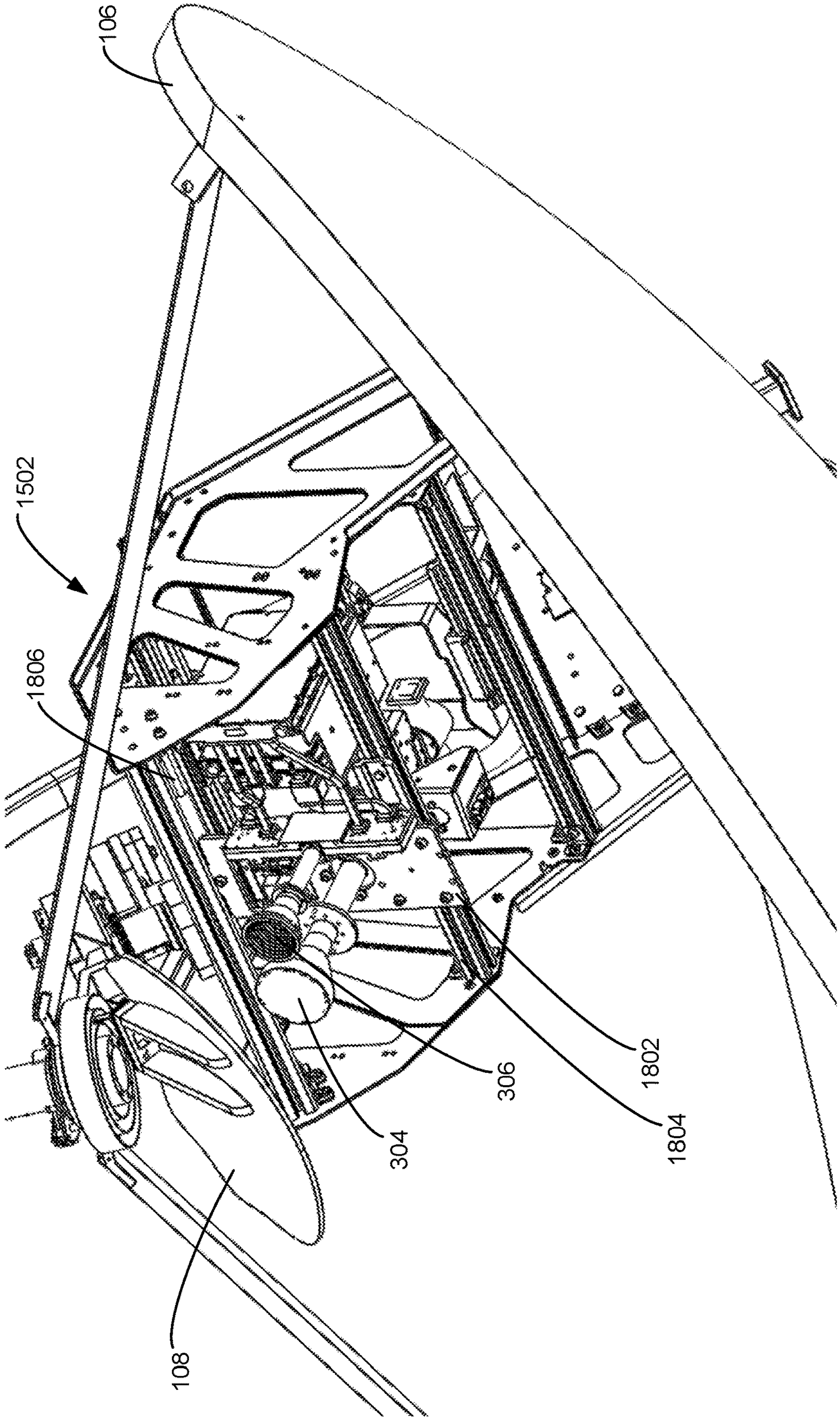
FIG. 18 is an enlarged perspective view of a movable feed sub-system, in accordance with some embodiments.
Figure 19:
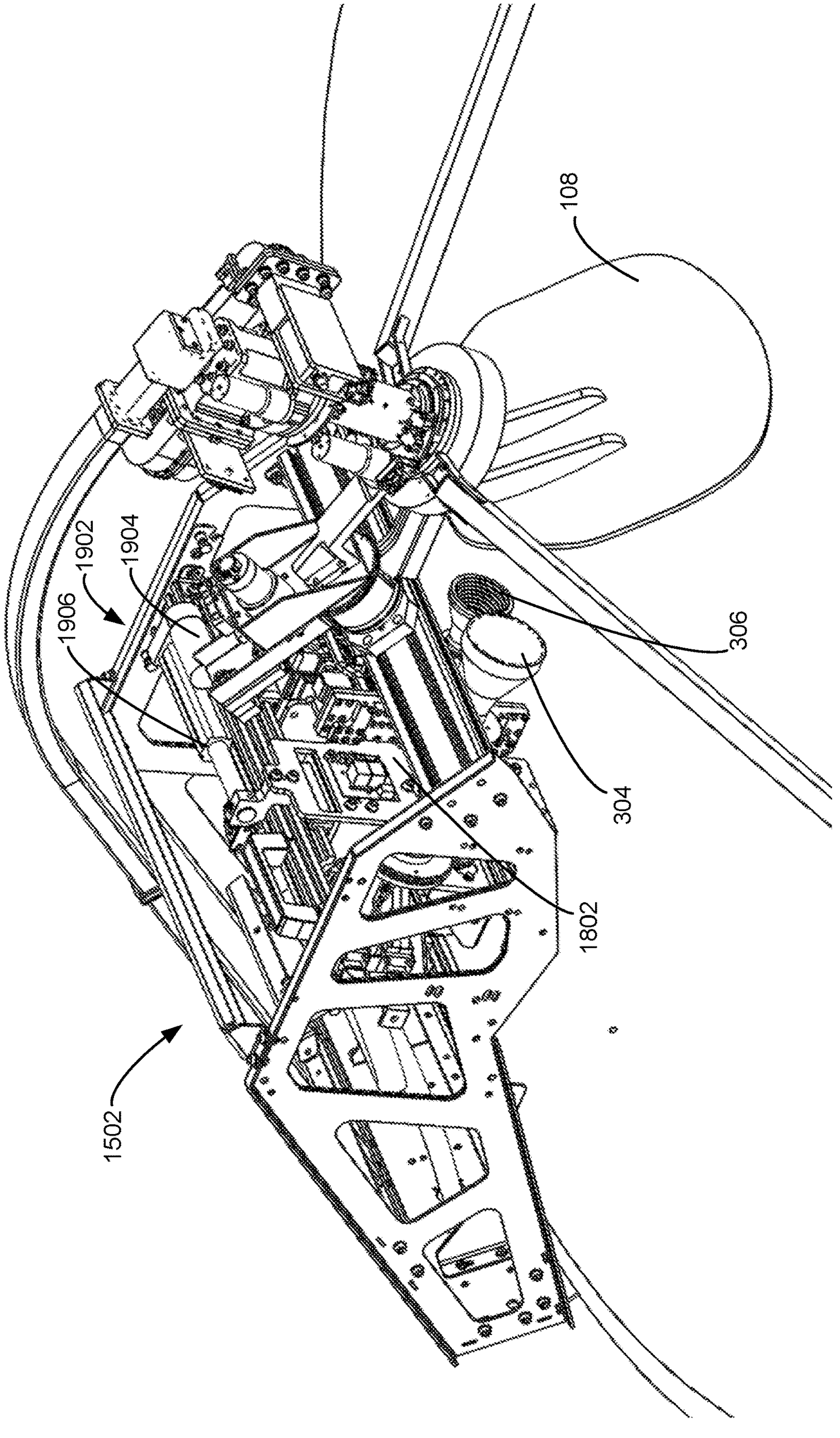
FIG. 19 is an enlarged perspective view of a linear actuator of a movable feed sub-system, in accordance with some embodiments.

FIGS. 18-19 are enlarged front perspective views of movable feed sub-system 1502 that includes a linear actuator, in accordance with some embodiments. As shown in FIG. 18, first movable feed 304 and second movable feed 306 are mounted to a movable feed assembly 1802 that is moved along one or more tracks (e.g., a first track 1804, a second track 1806, a third track 2202, and/or a fourth track 2208) between a first position (e.g., as shown in FIG. 20) and a second position (e.g., as shown in FIG. 21). In FIG. 19, a linear actuator system 1902 is shown. Linear actuator system 1902 includes a motor 1904. In some embodiments, linear actuator system 1902 includes a linkage that translates the turning motion imparted by the motor 1904 into linear motion of the movable feed assembly 1802 along one or more tracks. For example, linear actuator system 1900 includes a lead screw 1906 that translates the turning motion of the motor 1904 into linear motion of movable feed assembly 1802. In some embodiments, lead screw 1906 is rotated by motor 1904 via an internal gear (not shown).

FIGS. 20-21 are enlarged front perspective views of movable feed sub-system 102 that illustrate movement of movable feed assembly 1802 between a first position and a second position, in accordance with some embodiments. In some embodiments, movable feed assembly 1802 is coupled to lead screw 1906 via a connector as indicated at 2002. Movable feed assembly 1802 is movably coupled to track 1806 via bearings 2004 and 2008, to track 1804 via a bearing 2006, to track 2202 via bearings 2204 and 2206 (see FIG. 22), and to track 2208 via bearing 2210 (see FIG. 22). Bearings 2004, 2006, 2204, 2206, and/or 2208 stabilize movable feed assembly 1802 relative to a support structure of movable feed sub-system 1502 (e.g., by restricting motion of movable feed assembly 1802 to an axis that is parallel to the axis along which lead screw 1906 extends and retracts).

In FIG. 20, lead screw 1906 is shown in an extended position (e.g., such that first movable feed 304 is aligned along a signal path with subreflector 108 for transmission of signals between primary reflector 106 and first movable feed 304). From FIG. 20 to FIG. 21, motor 1904 has caused retraction of lead screw 1906 (e.g., such that second movable feed 306 is aligned along a signal path with subreflector 108 for transmission of signals between primary reflector 106 and second movable feed 306). As lead screw 1906 retracts, movable feed assembly 1802 is moved (e.g., via connector 2002) such that bearing 2004 moves along track 1806 and bearing 2006 moves along track 1804.

Figure 22:
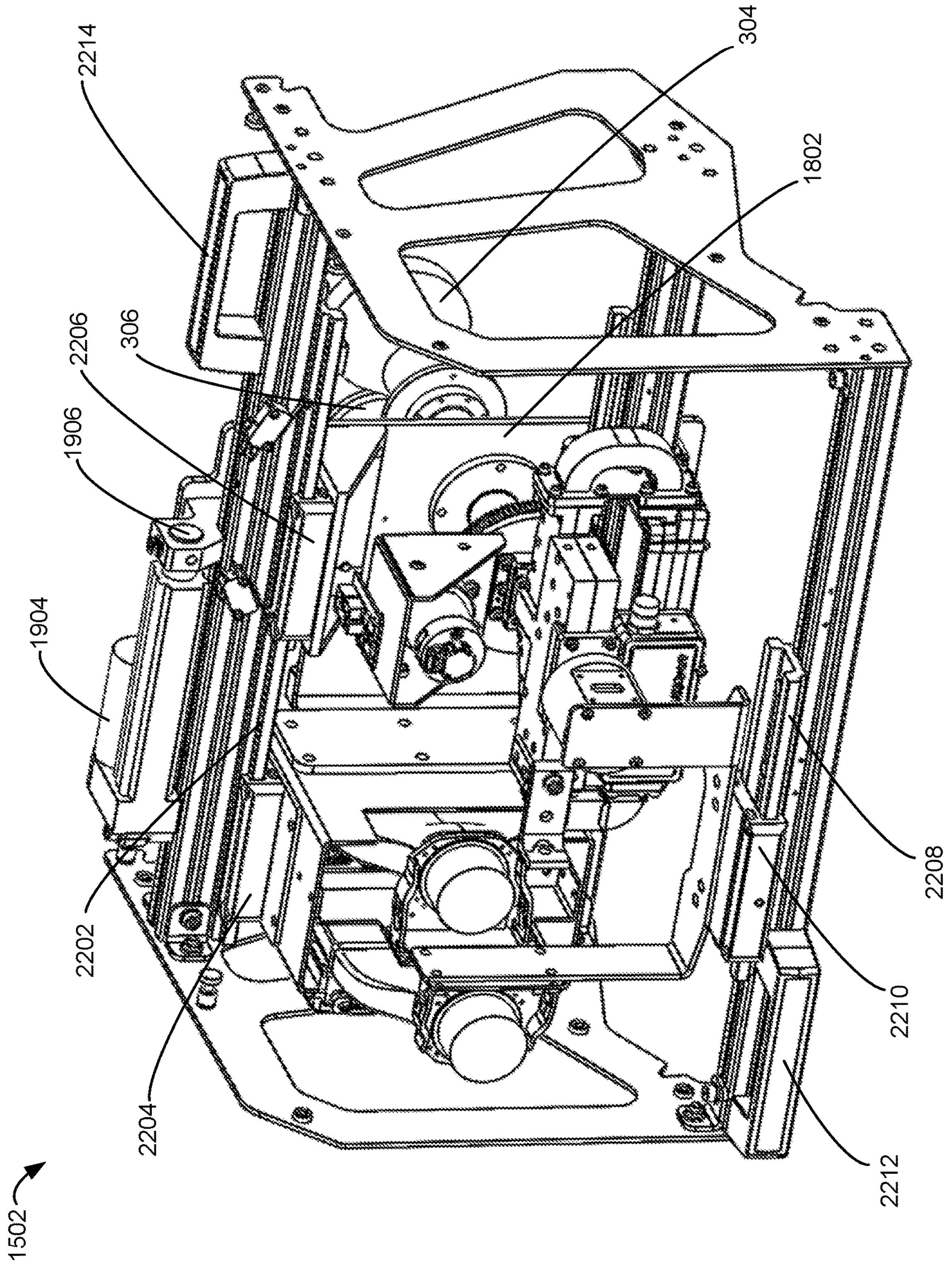
FIG. 22 illustrates an enlarged rear perspective view of a movable feed sub-system, in accordance with some embodiments.

FIG. 22 illustrates an enlarged rear perspective view of movable feed sub-system 1502, in accordance with some embodiments. Bearings 2204 and 2206 are coupled to movable feed assembly 1802 and are configured to move along track 2202. Bearing 2210 is coupled to movable feed assembly 1802 and is configured to move along track 2208. In some embodiments, movable feed sub-system 1502 includes one or more handles (e.g., handle 2212 and handle 2214) to aid in installation of movable feed sub-system 1502 to antenna system 1500.

Figure 23:
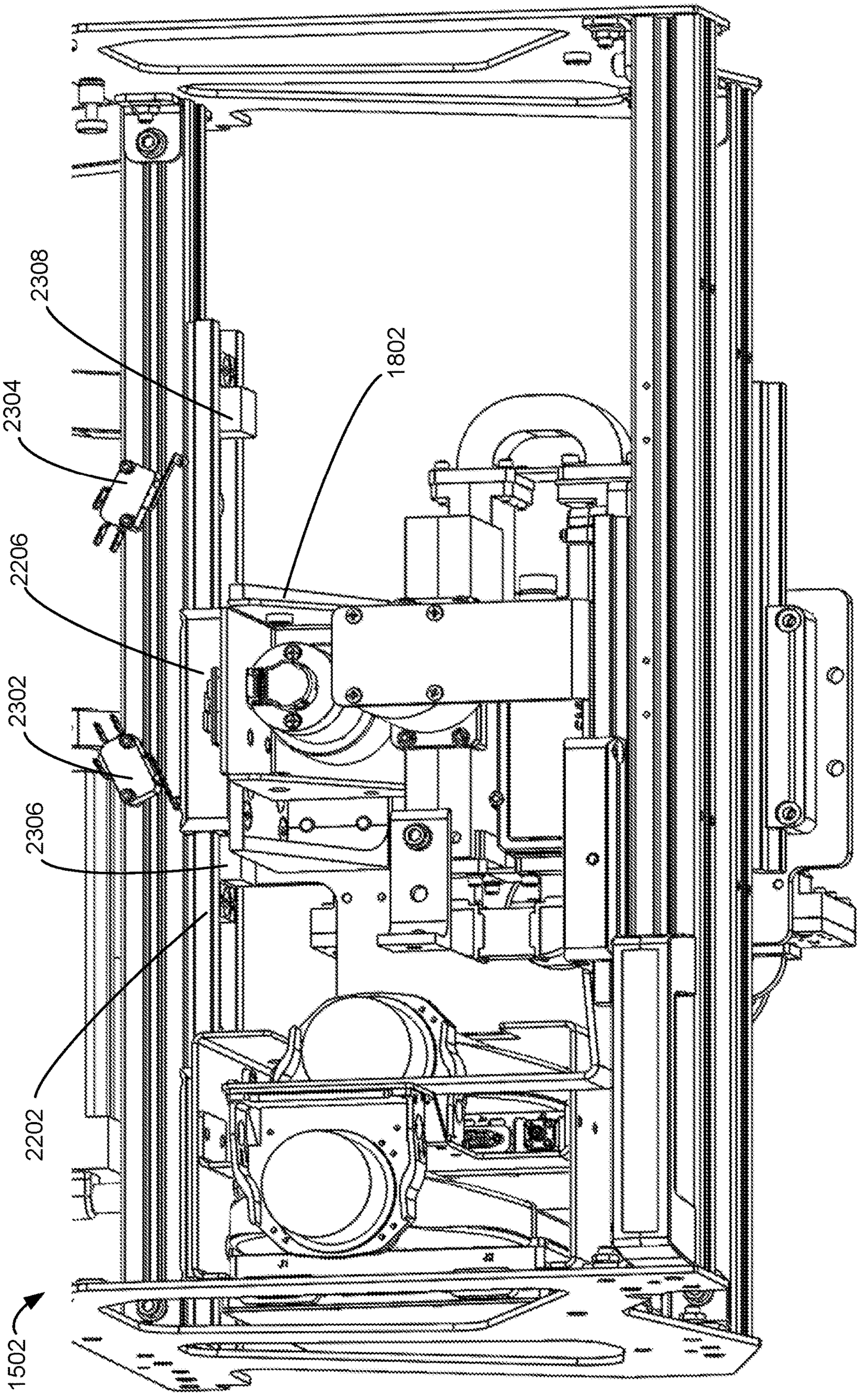
FIG. 23 illustrates an enlarged rear elevation view of a movable feed sub-system, in accordance with some embodiments.

FIG. 23 illustrates an enlarged rear elevation view of movable feed sub-system 1502, in accordance with some embodiments. In some embodiments, movable feed subsystem 1502 includes limit switches 2302 and 2304. When bearing 2206 comes into contact with an actuator of limit switch 2302 (e.g., as linear actuator system 1902 causes movement of movable feed assembly 1802 from a first position (e.g., as shown in FIG. 20) to a second position (e.g., as shown in FIG. 21)), switching occurs (e.g., an electrical connection is made between a set of contacts of limit switch 2302). When bearing 2206 comes into contact with an actuator of limit switch 2304 (e.g., as linear actuator system 1902 causes movement of movable feed assembly 1802 from the second position to the first position), switching occurs (e.g., an electrical connection is made between a set of contacts of limit switch 2304). In some embodiments, movable feed sub-system 1502 includes stop blocks 2306 and 2308. Stop block 2306 is a mechanical stop that limits motion of movable feed assembly 1802 beyond a fixed point as linear actuator system 1902 causes movement of movable feed assembly 1802 from a first position to a second position. Stop block 2308 is a mechanical stop that limits motion of movable feed assembly 1802 beyond a fixed point as linear actuator system 1902 causes movement of movable feed assembly 1802 from the second position to the first position.

In some embodiments, limit switches 2302 and 2304 are used to detect whether movable feed assembly 1802 reached the first position and the second position, respectively. In some embodiments, limit switch 2302 is coupled to movable feed sub-system 1502 at a fixed linear distance (e.g., ⅜") from stop block 2306 along track 2202. In this way, as movable feed assembly 1802 passes limit switch 2302 but before movable feed assembly 1802 reaches stop block 2306, the motion of the motor 1904 is decelerated in response to the switching of limit switch 2302 (e.g., such that motor 1904 does not operate at full speed as movable feed assembly 1802 reaches stop block 2306, which could result in overheating of and/or damage to the motor). In some embodiments, limit switch 2304 is coupled to movable feed sub-system 1502 at a fixed linear distance (e.g., ⅜") from stop block 2308 along track 2202, such that as movable feed assembly 1802 passes limit switch 2304, but before movable feed assembly 1802 reaches stop block 2308, the motion of the motor 1904 is decelerated in response to the switching of limit switch 2304 (e.g., such that motor 1904 does not operate at full speed as movable feed assembly 1802 reaches stop block 2308.

Figure 24:
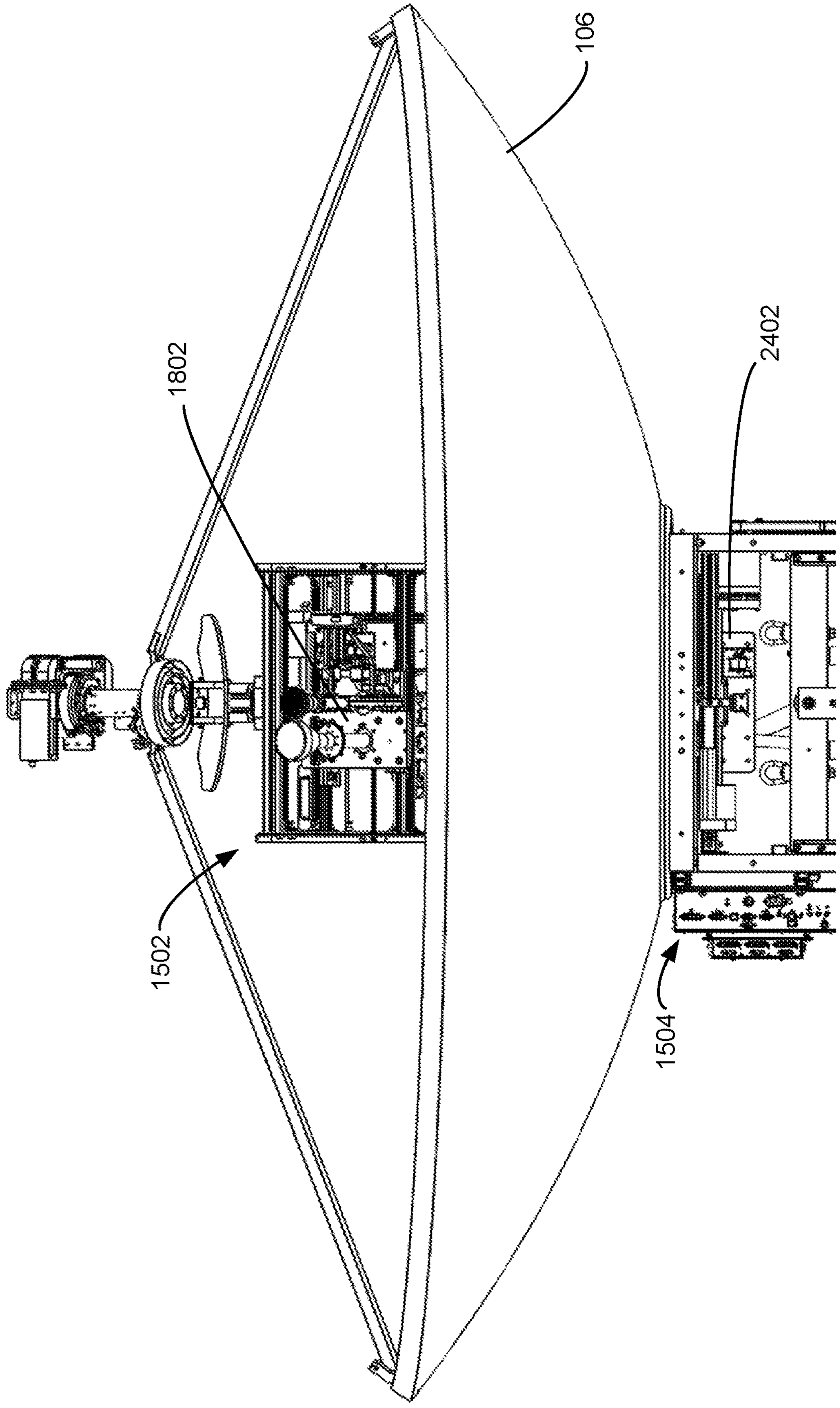
FIGS. 24-25 illustrate movement of movable feed assembly of a movable feed sub-system and corresponding movement of counterbalance of counterbalance sub-system, in accordance with some embodiments.
Figure 25:
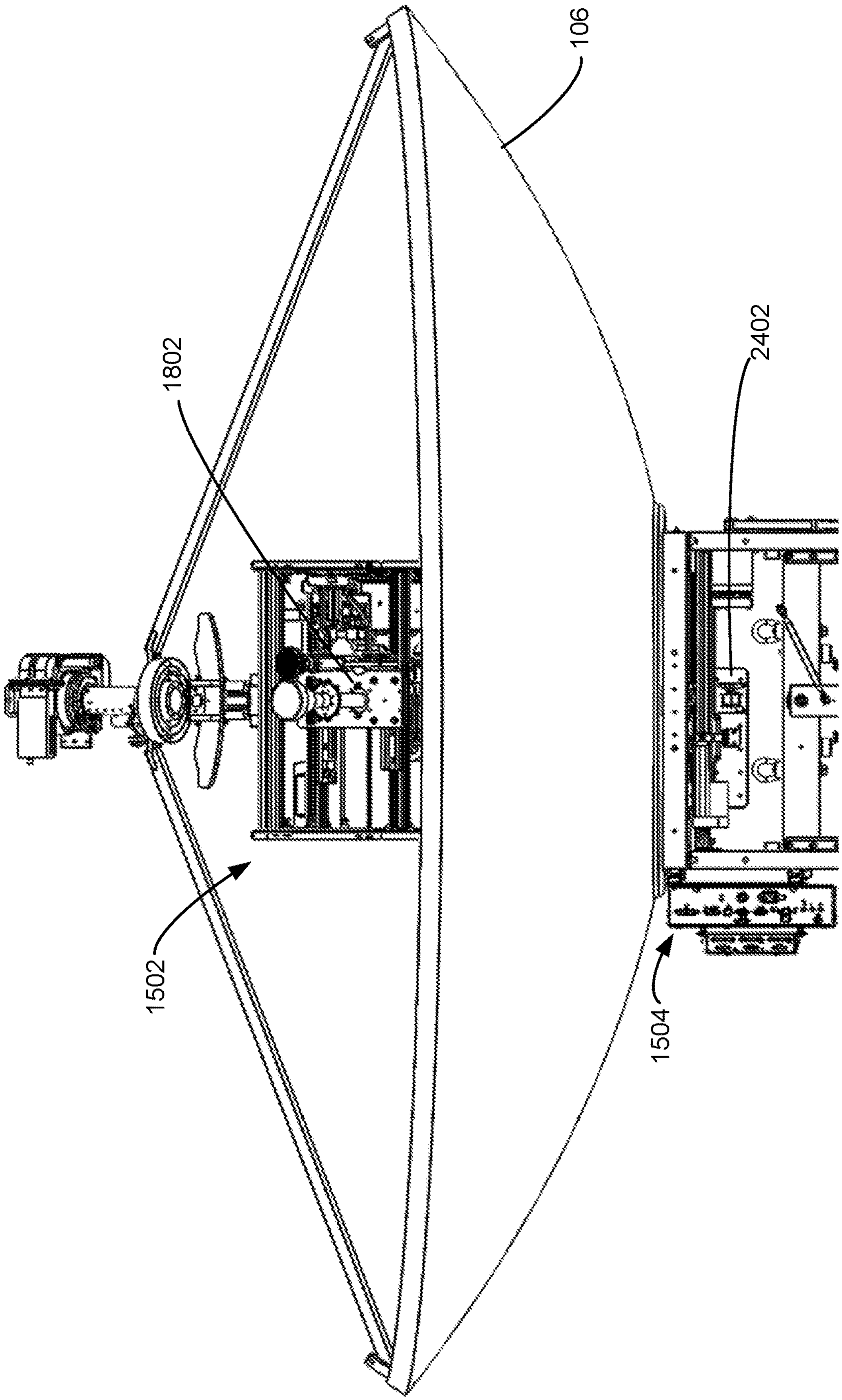

FIGS. 24-25 illustrate movement of movable feed assembly 1802 of movable feed sub-system 1502 and corresponding movement of counterbalance 2402 of counterbalance sub-system 1504 as movable feed assembly 1802 moves between a first position and a second position, in accordance with some embodiments. In some embodiments, counterbalance 2402 is configured to move synchronously with movement of the movable feed assembly 1802 in a direction that is opposite of the direction of motion of the movable feed assembly 1802. For example, as movable feed assembly 1802 moves in a first direction along elevation axis 2606 (see FIG. 26) from a first position shown in FIG. 24 to a second position shown in FIG. 25 (e.g., via retraction of lead screw 1906), counterbalance 2402 moves in an opposite direction along elevation axis 2606.

Figure 26:
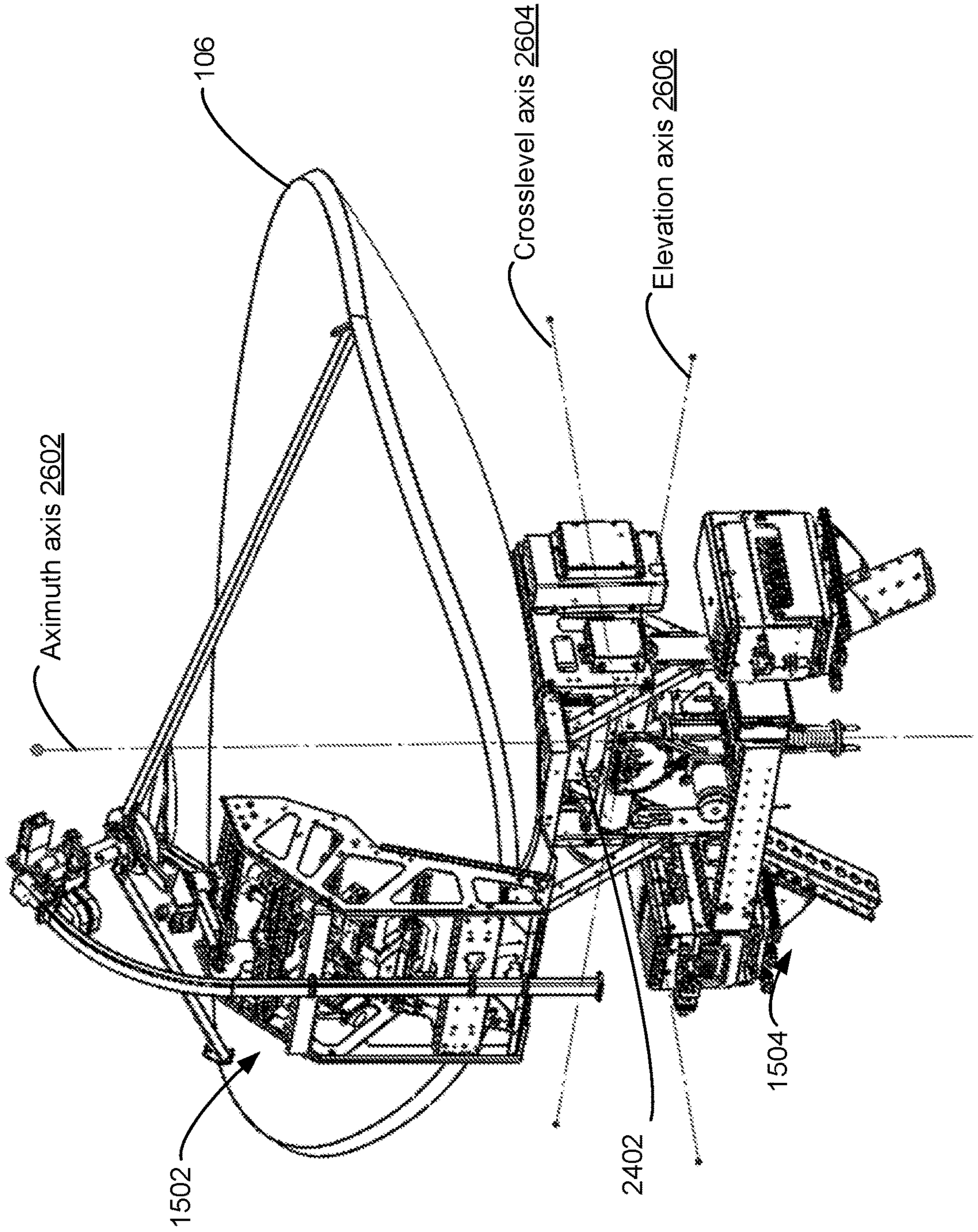
FIG. 26 is a perspective view of a movable feed subsystem and a counterbalance of a counterbalance sub-system relative to a set of axes, in accordance with some embodiments.

FIG. 26 shows a perspective view of movable feed sub-system 1502 and counterbalance 2402 of counterbalance sub-system 1504 relative to a coordinate system defined by an azimuth axis 2602, a cross level axis 2604, and an elevation axis 2606, in accordance with some embodiments.

Figure 27:
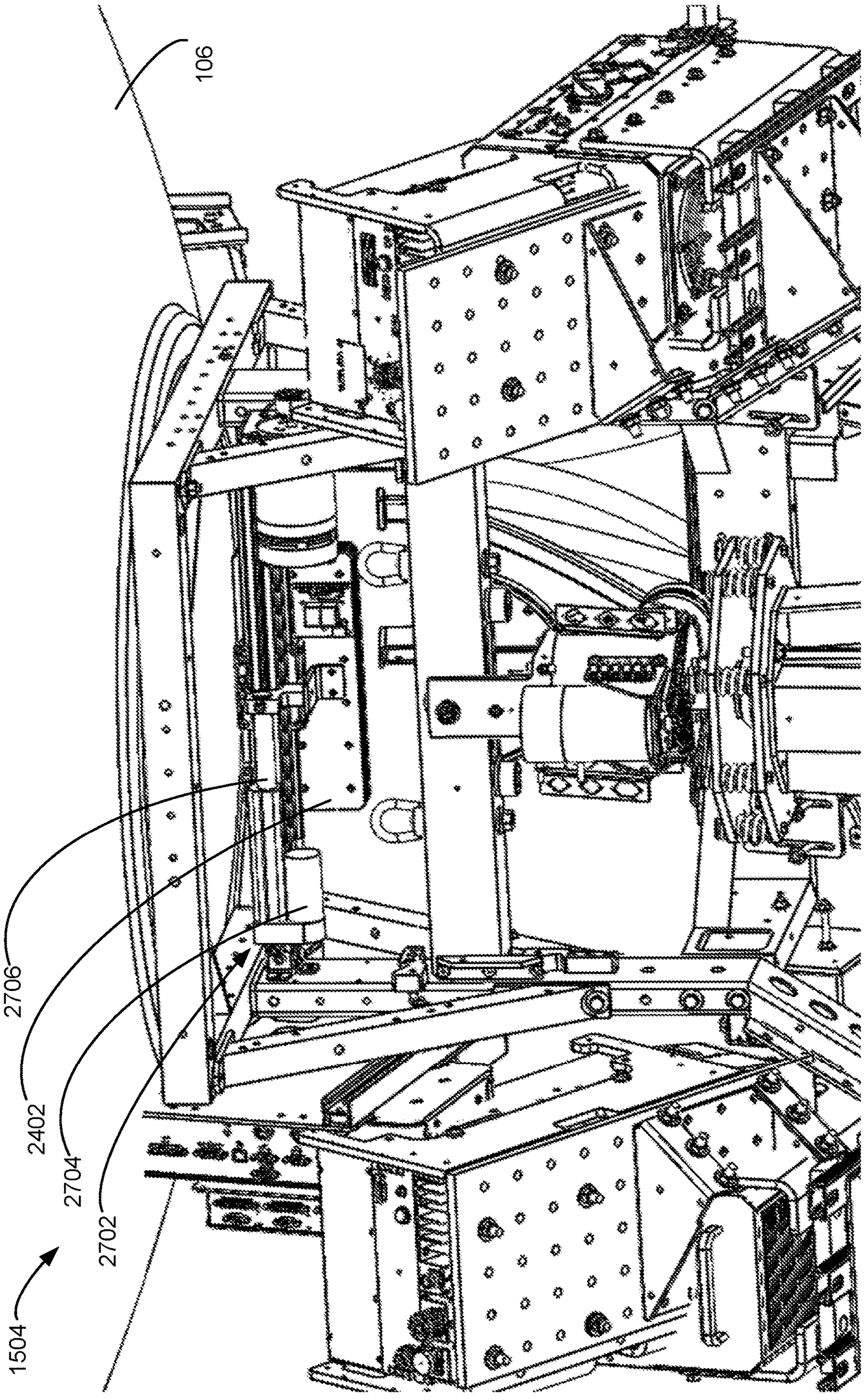
FIG. 27 is an enlarged view of a counterbalance subsystem, in accordance with some embodiments.

FIG. 27 is an enlarged view of counterbalance sub-system 1504, in accordance with some embodiments. Counterbalance sub-system 1504 includes a linear actuator system 2702. Linear actuator system 2702 includes a motor 2704. In some embodiments, linear actuator system 2702 includes a linkage that translates the turning motion imparted by the motor 2702 into linear motion of the counterbalance along one or more tracks (e.g., track 2802). For example, linear actuator system 2702 includes a lead screw 2706 that translates the turning motion of the motor 2704 into linear motion of counterbalance 2402. In some embodiments, lead screw 2706 is coupled to motor 2704 via an internal gear (not shown).

Figure 28:
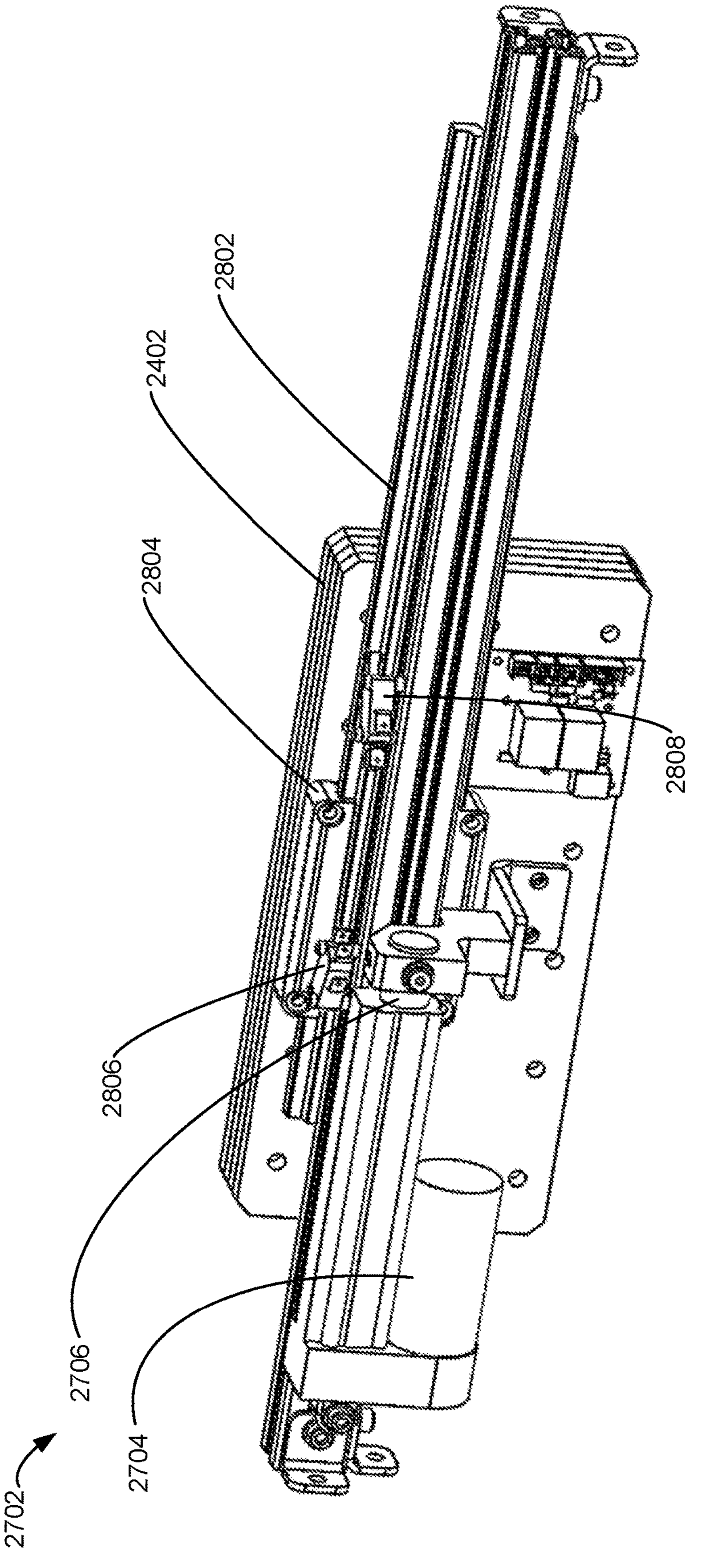
FIGS. 28-29 illustrate movement of a counterbalance between a first position and a second position by a linear actuator system, in accordance with some embodiments.

FIG. 28 illustrates an enlarged view of linear actuator system 2702 for movement of counterbalance 2402, in accordance with some embodiments. Bearing 2804 is coupled to counterbalance 2402 and is configured to move along track 2802. In some embodiments, counterbalance sub-system 1504 includes limit switches 2806 and 2808. When bearing 2804 comes into contact with an actuator of limit switch 2808 (e.g., as linear actuator system 2702 causes movement of counterbalance 2402 from a first position (e.g., as shown in FIG. 28) to a second position (e.g., as shown in FIG. 29)), switching occurs (e.g., an electrical connection is made between a set of contacts of limit switch 2808). When bearing 2804 comes into contact with an actuator of limit switch 2806 (e.g., as linear actuator system 2702 causes movement of counterbalance 2402 from the second position to the first position), switching occurs (e.g., an electrical connection is made between a set of contacts of limit switch 2806). In some embodiments, limit switches 2806 and 2808 are used to detect whether counterbalance 2402 has reached the first position and the second position, respectively. In some embodiments, limit switches 2806 and 2808 are used to decelerate the motor as counterbalance 2402 approaches the first position and the second position, respectively.

From FIG. 28 to FIG. 29, motor 2704 has caused extension of lead screw 2706. As lead screw 2706 extends, counterbalance 2402 is moved such that bearing 2804 moves along track 2802.

FIG. 30 is a system diagram of an antenna control unit, in accordance with some embodiments. In some embodiments, antenna control unit 3002 includes one or more processors for processing communication signals and/or providing instructions for moving one or more elements of antenna system 1500. Antenna control unit 3002 is communicatively coupled to a feed actuating system motor interface board 3004 and counterbalance motor interface board 3012.

Feed actuating system motor interface board 3004 is communicatively coupled to motor 1904. For example, actuating system motor interface board 3004 generates an instruction for operating motor 1904 in order to adjust a position of movable feed assembly 1802. In some embodiments, feed actuating system motor interface board 3004 is coupled to outer limit switch 2304 and inner limit switch 2302. For example, counterbalance motor interface board 3012 receives switching signals from limit switch 2302 and/or 2304. In some embodiments, a signal from a limit switch is used to determine whether the movable feed assembly 1802 reached a position that corresponds to a respective limit switch 2302 or 2304. In some embodiments, a signal from a limit switch is used to decelerate motion of the motor as the movable feed assembly 1802 moves toward the first position or the second position.

Counterbalance motor interface board 3012 is communicatively coupled to motor 2704. For example, counterbalance motor interface board 3012 generates an instruction for operation of motor 2704 in order to adjust a position of counterbalance 2402. In some embodiments, counterbalance motor interface board 3012 is coupled to outer limit switch 2808 and inner limit switch 2806. For example, counterbalance motor interface board 3012 receives signals from limit switch 2808 and/or 2806. In some embodiments, a signal from a limit switch is used to determine whether the counterbalance 2402 reached a position that corresponds to a respective limit switch 2806 or 2808. In some embodiments, a signal from a limit switch is used to decelerate motion of the motor 2704 as the counterbalance 2402 moves toward the first position or the second position.

FIG. 31 illustrates parallel operation of motor 1904 and motor 2704, in accordance with some embodiments. In some embodiments, in accordance with a determination that band-switching is to be performed (e.g., from a $K_u$-band to a $K_a$-band or vice versa), antenna control unit 3002 transmits, in parallel, an instruction to feed actuation system motor interface board 3004 for activating motor 1904, as illustrated by arrow 3102, and an instruction to counterbalance motor interface board 3012 for activating motor 2704, as illustrated by arrow 3104. Feed actuation system motor interface board 3004 transmits an instruction, as illustrated by arrow 3106, to motor 1904 for moving movable feed assembly 1802. Counterbalance motor interface board 3012 transmits an instruction, as illustrated by arrow 3108, to motor 2704 for moving counterbalance 2402.

In some embodiments, in accordance with a determination (e.g., after an instruction 3102 was transmitted for moving movable feed assembly 1802) that bearing 2206 did not reach a position that corresponds to a respective limit switch 2304 or 2302 (e.g., indicating a motor failure), antenna control unit 3002 transmits an instruction to stop and/or reverse motion of counterbalance 2402 (e.g., to maintain balance of the movable feed assembly 1802 and the counterbalance 2402). In some embodiments, in accordance with a determination (e.g., after an instruction 3104 was transmitted for moving counterbalance 2402) that bearing 2804 did not reach a position that corresponds to a respective limit switch 2806 or 2808 (e.g., indicating a motor failure), antenna control unit 3002 transmits an instruction to stop and/or reverse motion of movable feed assembly 1802 (e.g., to maintain balance of the movable feed assembly 1802 and the counterbalance 2402).

FIGS. 32A-32D are system diagrams that illustrate serial operation of motor 1904 and motor 2704, in accordance with some embodiments. Operation of a motor 1904 that is serially connected to motor 2704 beneficially causes motion of one motor to stop when the other motor is non-operational, thereby maintaining a counterbalance between components of movable feed assembly 1802 and counterbalance 2402.

Figure 32A:
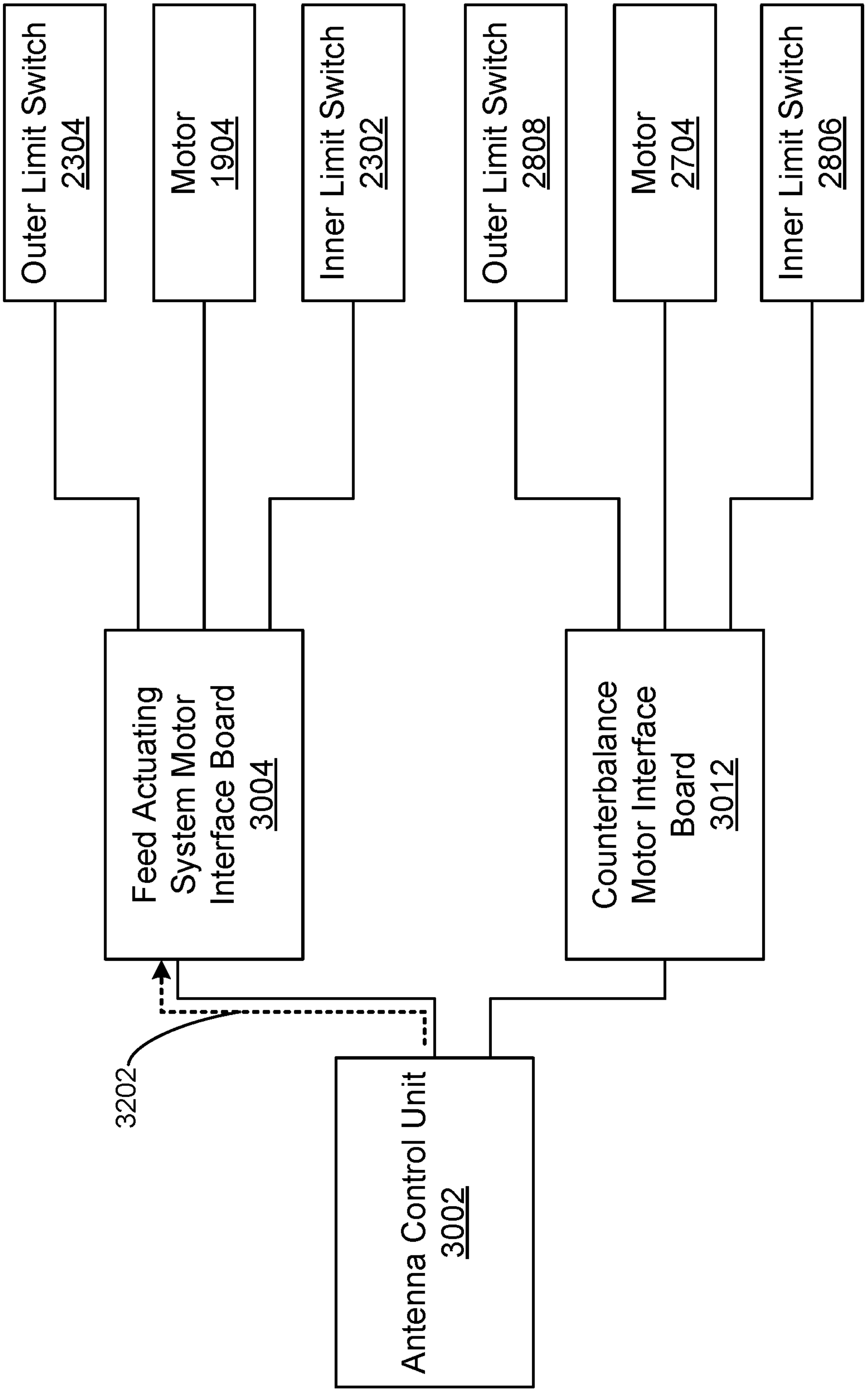
FIGS. 32A-32D illustrate serial operation of a feed assembly motor and a counterbalance motor, in accordance with some embodiments.
Figure 32B:
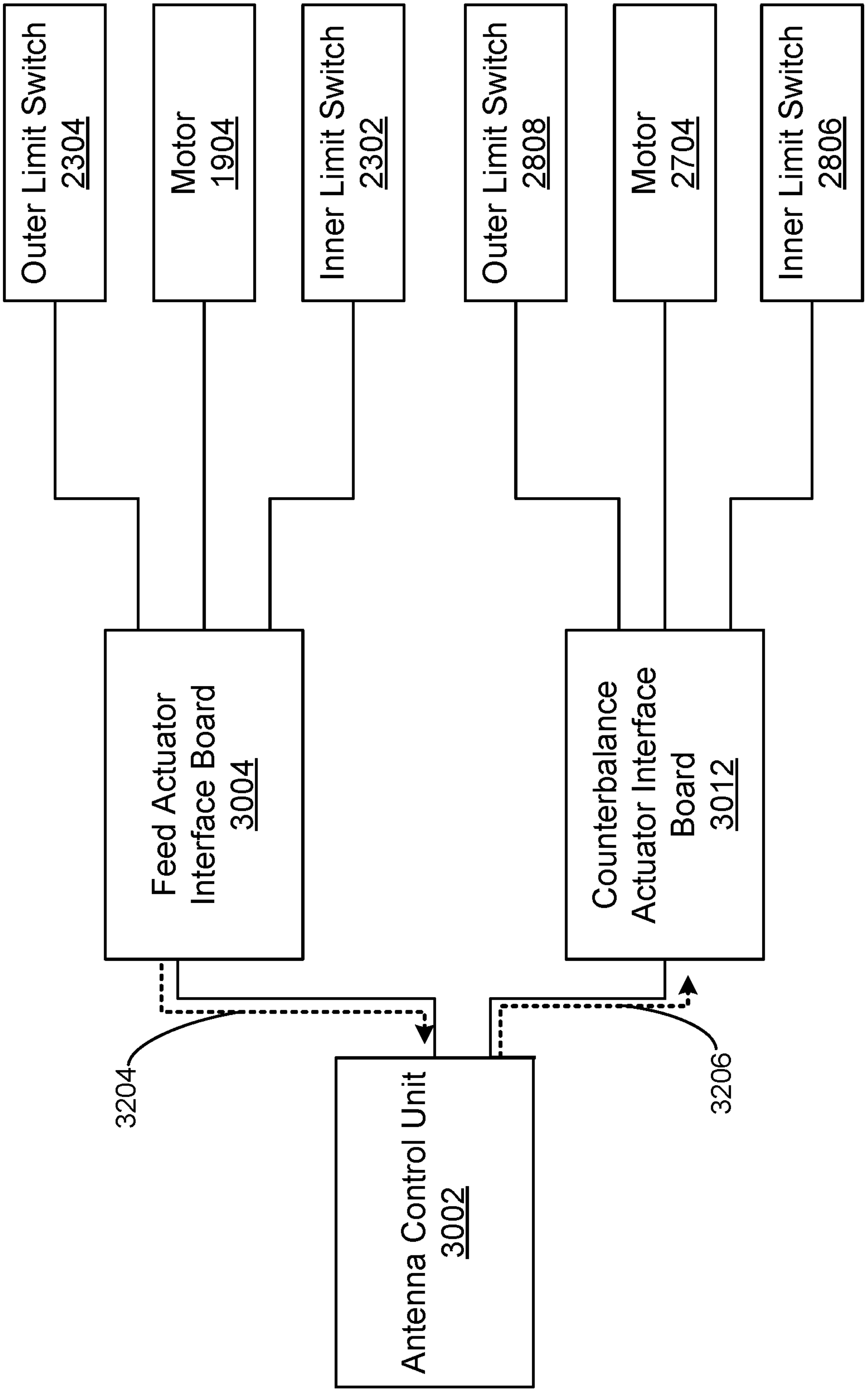
Figure 32C:
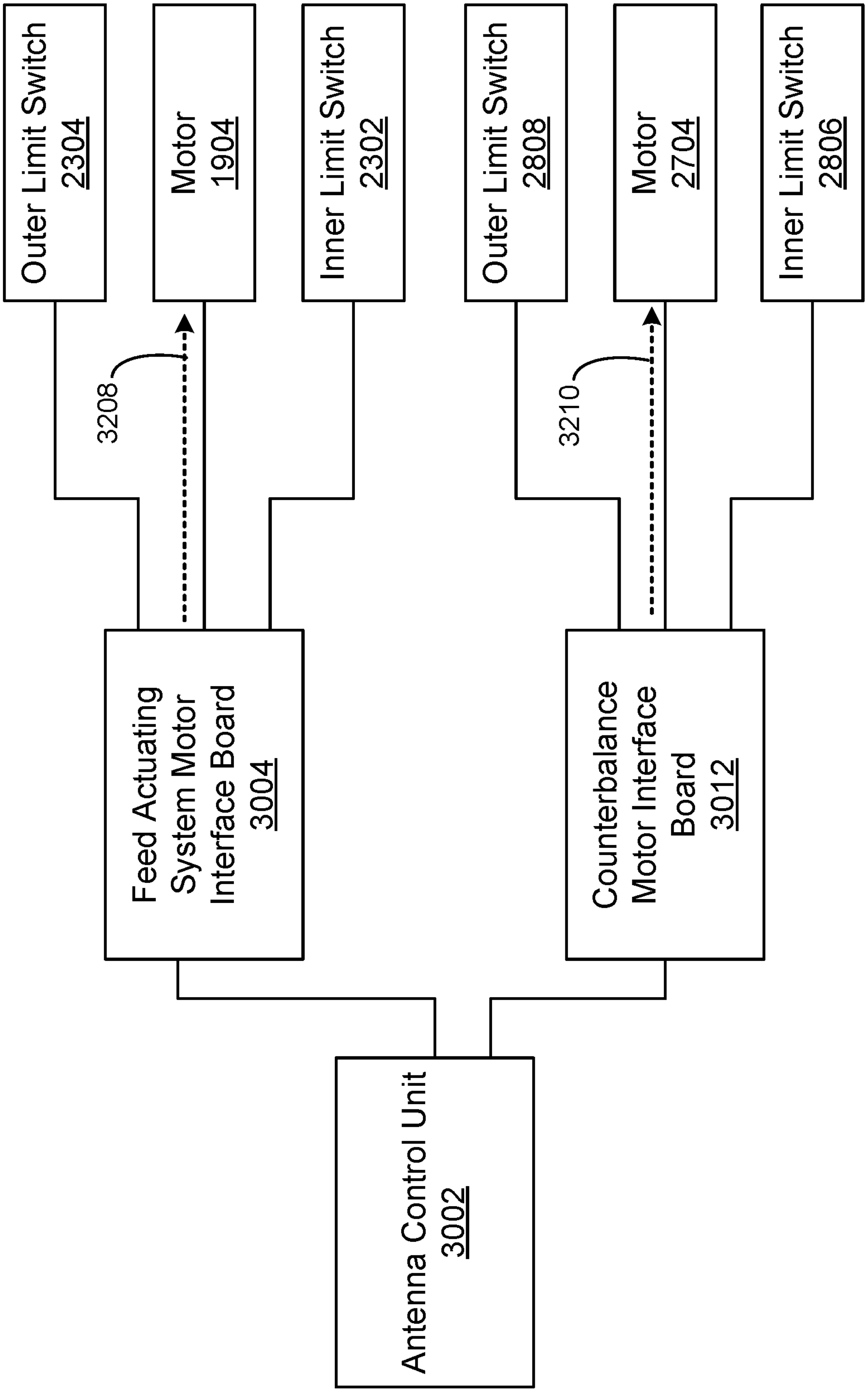

FIGS. 32A-32C illustrate a first approach to serial operation of motor 1904 and motor 2704. In FIG. 32A, in accordance with a determination that band-switching is to be performed (e.g., from a $K_u$-band to a $K_a$-band or vice versa), antenna control unit 3002 transmits a motor operation instruction to feed actuation system motor interface board 3004, as illustrated by arrow 3202. In FIG. 32B, feed actuator interface board 3004 transmits the motor operation instruction to counterbalance actuator interface board 3012 via antenna control unit 3002, as illustrated by arrows 3204-3206. In FIG. 32C, feed actuation system motor interface board 3004 transmits an instruction to motor 1904 for moving movable feed assembly 1802, as illustrated by arrow 3208, and counterbalance motor interface board 3012 transmits an instruction to motor 2704 for moving counterbalance 2402, as illustrated by arrow 3210. In this way, if a failure in feed actuating system motor interface board 3004 prevents control of motor 1904, counterbalance motor interface board 3012 is also prevented from controlling motor 2704 such that a balance between movable feed assembly 1802 and counterbalance 2402 is maintained.

Figure 32D:
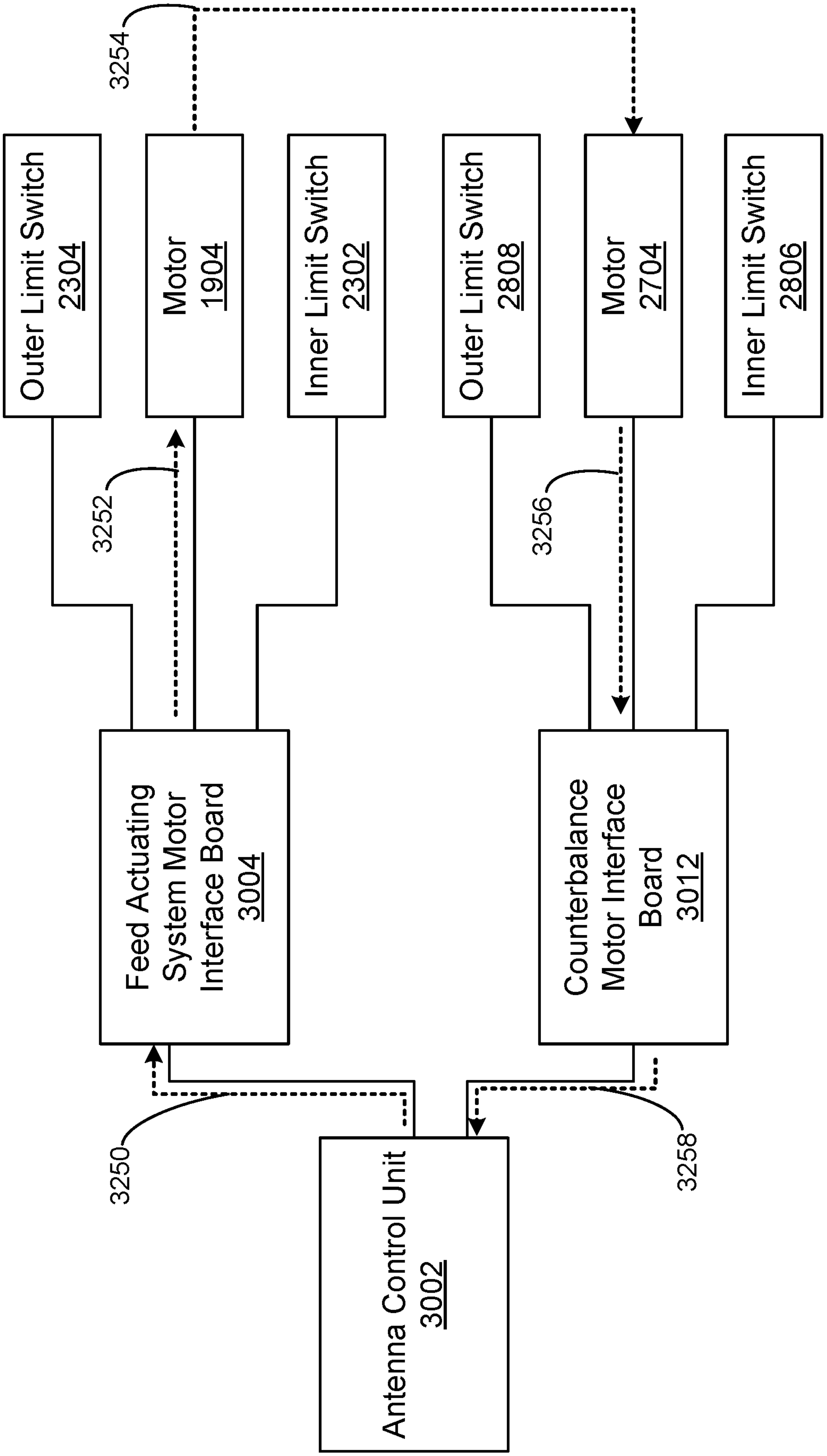

FIG. 32D illustrates a second approach to serial operation of motor 1904 and motor 2704. In FIG. 32D, in accordance with a determination that band-switching is to be performed (e.g., from a $K_u$-band to a $K_a$-band or vice versa), antenna control unit 3002 transmits a motor operation instruction to feed actuating system motor interface board 3004, as illustrated by arrow 3250. Feed actuator interface board 3004 transmits the motor operation instruction to motor 1904, as illustrated by arrow 3252. A signal is transmitted from motor 1904 (as shown), outer limit switch 2304, and/or inner limit switch 2302 to motor 2704, as illustrated by arrow 3254. In this way, a condition (e.g., failure) of motor 1904 that prevents or otherwise affects operation of motor 1904 causes, via the serial connection (e.g., between the motor 1904 and motor 2704), operation of motor 2704 to be altered. In this way, balance between movable feed assembly 1802 and counterbalance 2402 is maintained. A signal, as indicated by arrow 3256, is transmitted from motor 2704 (as shown), outer limit switch 2808, and/or inner limit switch 2806 to counterbalance motor interface board 3012 (e.g., to indicates a state of operation of motor 2704). Counterbalance motor interface board 3012 transmits a signal to antenna control unit 3002, as indicated by arrow 3258 (e.g., to indicates a state of operation of motor 2704). In some embodiments, antenna control unit 3002 determines a motor operation instruction to transmit to feed actuating system motor interface board 3004 using the signal indicated by arrow 3258. In this way, a condition (e.g., failure) of motor 2704 that prevents or otherwise affects operation of motor 2704 causes, via the serial connection (e.g., between the motor 2704 and motor 1904 along a path indicated by arrows 3256, 3258, 3250, and 3252), operation of motor 1904 to be altered. It will be recognized that, in accordance with various embodiments, the signal transmission path described above with regard to arrows 3250-3258 is reversed.

Figure 33A:
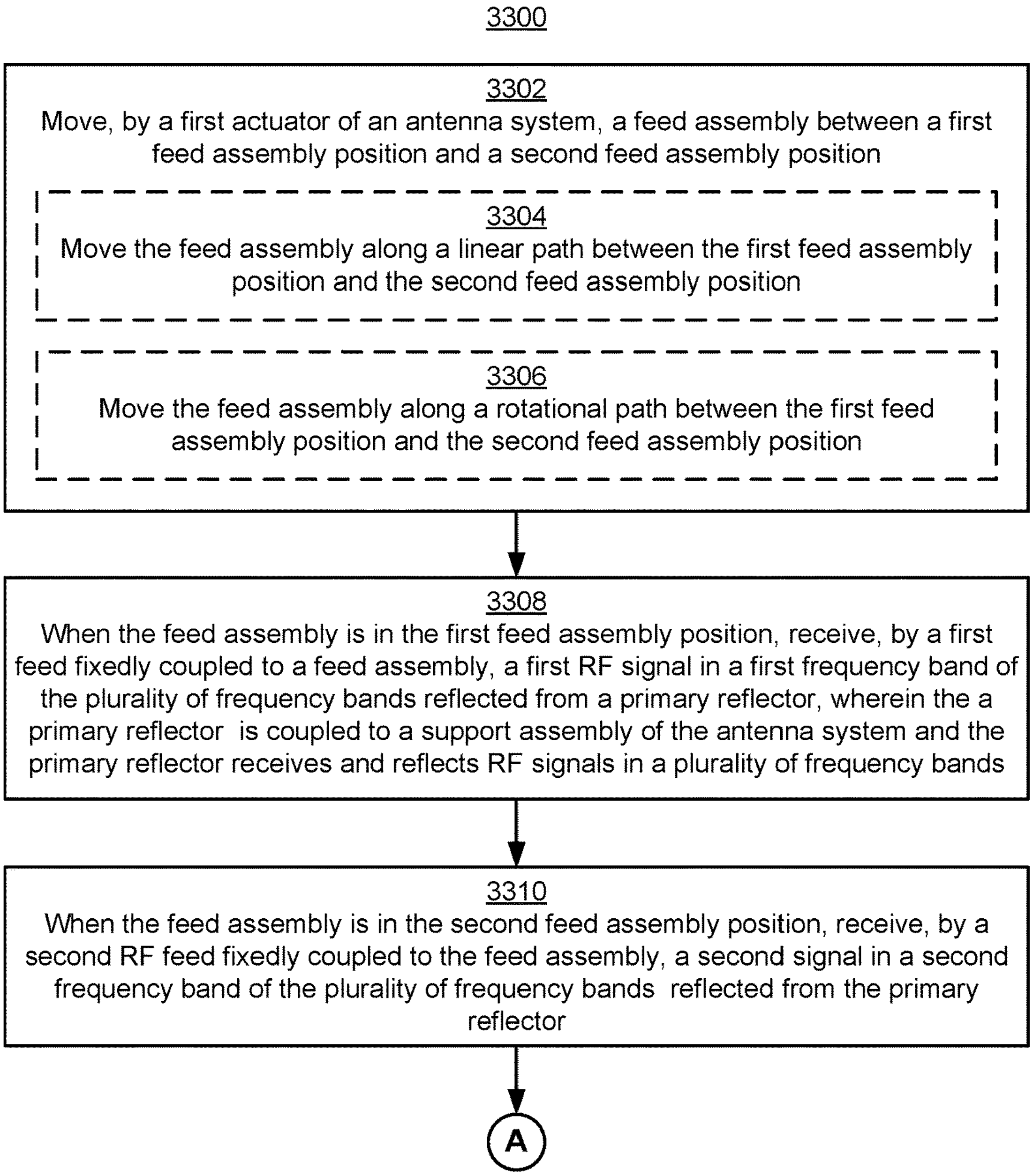
FIGS. 33A-33C are flow charts illustrating a method for receiving signals having frequencies in a plurality of radio frequency (RF) ranges, in accordance with some embodiments.
Figure 33B:
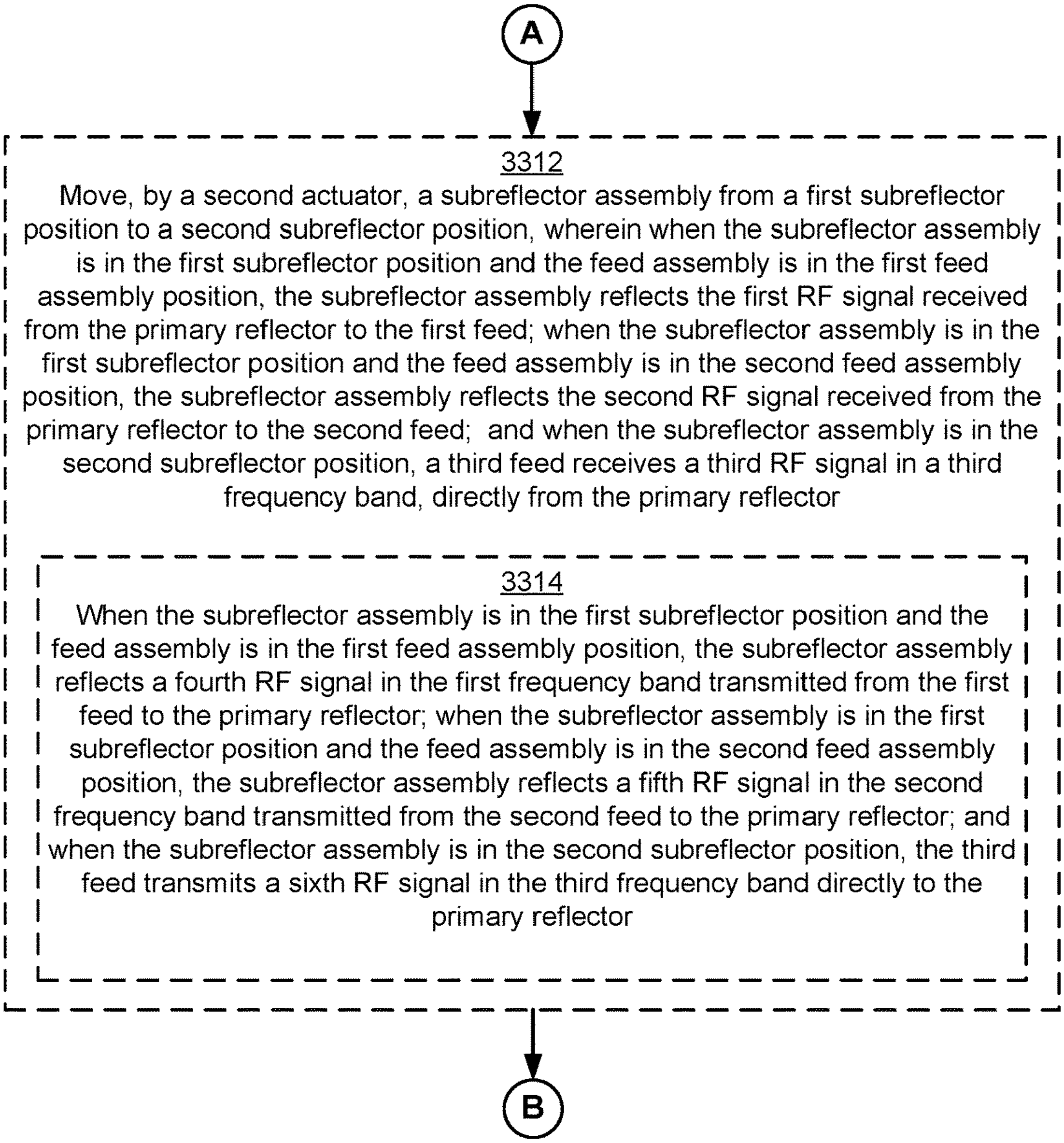
Figure 33C:
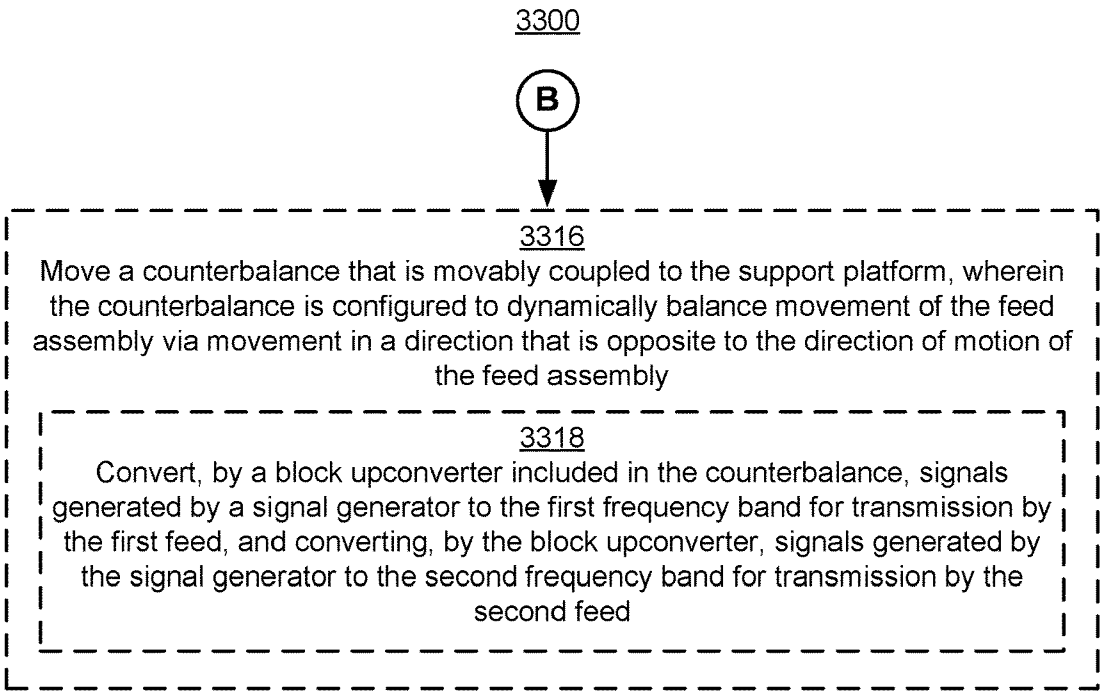

FIGS. 33A-33B are flow diagrams illustrating a method 3300 for receiving signals having frequencies in a plurality of radio frequency (RF) frequency ranges, in accordance with some embodiments. The method 3300 is performed at a device, such as an antenna system (e.g., antenna system 100 or antenna system 1500) that includes: a support assembly 104, a primary reflector 106 that is coupled to the support assembly 104, a feed assembly (e.g., movable feed platform 506 or movable feed assembly 1502) that is movably coupled to the support assembly 104, a first actuator (e.g., 604 or 1904) configured to move the movable feed assembly, a first movable feed 304 fixedly coupled to the movable feed assembly, and a second movable feed 306 fixedly coupled to the movable feed assembly. The primary reflector 106 receives and reflects RF signals in a plurality of frequency bands (e.g., the C-band, the $K_a$-band, and the $K_u$-band). In some embodiments, the feed assembly is coupled to the primary reflector 106 (e.g., in lieu of being coupled to the support assembly or in addition to being coupled to the support assembly). In some embodiments, the antenna system includes a computing system with one or more processors and memory. For example, instructions for performing the method 3300 are stored in the memory and executed by the one or more processors. In some embodiments, part or all of the instructions for performing the method 3300 are performed by antenna control unit 3002.

The first actuator moves (3302) the movable feed assembly (e.g., movable feed platform 506 or movable feed assembly 1802) between a first feed platform position (e.g., as illustrated in FIG. 7 or as illustrated in FIG. 20) and a second feed platform position (e.g., as illustrated in FIG. 8 or as illustrated in FIG. 21). For example, an actuator system 600 including a motor 604, as described with regard to FIG. 6, moves the movable feed platform 506. In some embodiments, the feed assembly moves (3304) along a linear path between the first feed assembly position and the second feed assembly position. For example, a linear actuator system 1902 including a motor 1904, as described with regard to FIG. 19, moves the movable feed assembly 1802 along one or more tracks (e.g., tracks 1804, 1806, 2202, and/or 2208) via extension and retraction of a lead screw 1906. In some embodiments, the feed assembly moves (3306) along a rotational path between the first feed assembly position and the second feed assembly position.

When the feed assembly is in the first feed assembly position, the antenna system 100 receives (3308), by the first movable feed 304, a first RF signal in a first frequency band (e.g., the $K_u$-band) of the plurality of frequency bands reflected from the primary reflector 106.

When the feed assembly is in the second feed assembly position, the antenna system 100 receives (3310), by the second movable feed 306, a second signal in a second frequency band (e.g., the $K_a$-band) of the plurality of frequency bands reflected from the primary reflector.

In some embodiments, a second actuator moves (3312) a subreflector assembly 108 from a first subreflector position to a second subreflector position (e.g., as shown in FIGS. 3-4, FIGS. 12-13, and/or FIGS. 16-17). When the subreflector assembly 108 is in the first subreflector position and the movable feed assembly 506 is in the first feed assembly position (e.g., as shown in FIG. 11), the subreflector assembly 108 reflects the first RF signal received from the primary reflector 106 to the first movable feed 304. When the subreflector assembly 108 is in the first subreflector position and the feed assembly is in the second feed assembly position (e.g., as shown in FIG. 12), the subreflector assembly reflects the second RF signal received from the primary reflector 106 to the second movable feed 306. When the subreflector assembly is in the second subreflector position (e.g., as shown in FIG. 13), a third feed 202 receives a third RF signal in a third frequency band (e.g., the C-band), directly from the primary reflector 106.

In some embodiments, antenna system 100 transmits signals in one or more frequency bands. In some embodiments (3314), when the subreflector assembly 108 is in the first subreflector position and the movable feed assembly is in the first feed assembly position (e.g., as shown in FIG. 11), the subreflector assembly 108 reflects a fourth RF signal in the first frequency band (e.g., the $K_u$-band) transmitted from the first movable feed 304 to the primary reflector 106. When the subreflector assembly 108 is in the first subreflector position and the feed assembly is in the second feed assembly position (e.g., as shown in FIG. 12), the subreflector assembly 108 reflects a fifth RF signal in the second frequency band (e.g., the $K_a$-band) transmitted from the second movable feed 306 to the primary reflector 106. When the subreflector assembly is in the second subreflector position (e.g., as shown in FIG. 13), the third feed 202 transmits a sixth RF signal in the third frequency band (e.g., the C-band) directly to the primary reflector 106.

In some embodiments, antenna system 100 moves (3316) a counterbalance (e.g., counterbalance 706 that is movably coupled to movable feed sub-system 200 or counterbalance 2402 that is movably coupled to support assembly 104). The counterbalance is configured to move synchronously with movement of the movable feed assembly in a direction that is opposite to the direction of motion of the movable feed assembly. Movement of a counterbalance (e.g., 706 or 2402) in a direction that is opposite to the movement of the movable feed platform (e.g., 506 or 1802) avoids undesired movement of components of antenna 100 due to motion of the movable feed platform for band switching. For example, In some embodiments, the counterbalance (e.g., counterbalance 706 or counterbalance 2402) includes a plurality (e.g., 2-5) of weight components (e.g., metal weights, such as steel plates). In some embodiments, one or more of the weight components of the counterbalance is removable (e.g., such that the total amount of weight of the counterbalance is adjustable). In some embodiments, the counterbalance includes a support device (e.g., a bracket) for supporting an additional weight component.

In some embodiments, the counterbalance (e.g., counterbalance 706) includes a block upconverter that converts (3318) signals generated by a signal generator to the first frequency band (e.g., the $K_u$-band) for transmission by the first movable feed 304 and converts signals generated by the signal generator to the second frequency band (e.g., the $K_a$-band) for transmission by the second movable feed 306.

In some embodiments, the feed assembly and the counterbalance are coupled to the movable feed sub-system. For example, as shown in FIG. 7, movable feed platform 506 and counterbalance 706 are movably coupled to movable feed sub-system 200. In some embodiments, primary reflector 106 is positioned between the feed assembly and the counterbalance. For example, as shown in FIGS. 15 and 24, movable feed sub-system 1502 is coupled to support assembly 104 and/or primary reflector 106 (e.g., such that reflecting surface of primary reflector 106 faces movable feed assembly 1802) and counterbalance sub-system 1504 is coupled to support assembly 104 (e.g., such that the non-reflecting surface of primary reflector 106 faces counterbalance 2402). Locating the counterbalance remotely from the feed assembly (e.g., by positioning the counterbalance and the feed assembly on opposite sides of primary reflector 106) advantageously distributes the added weight of the feed assembly and the counterbalance. For a feed assembly that is at least partially supported by support structure(s) coupled to primary reflector 106, locating the counterbalance remotely from the feed assembly reduces deflection of the primary reflector 106.

Features of the present invention can be implemented in, using, or with the assistance of a computer program product, such as a storage medium (media) or computer readable storage medium (media) having instructions stored thereon/in which can be used to program a processing system to perform any of the features presented herein. The storage medium can include, but is not limited to, high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory optionally includes one or more storage devices remotely located from the CPU(s). Memory or alternatively the non-volatile memory device(s) within memory comprises a non-transitory computer readable storage medium.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems, and execution environments/containers.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. An antenna system for communicating signals having radio frequencies in a plurality of radio frequency (RF) bands, the antenna system comprising:

a support assembly;

a primary reflector that is coupled to the support assembly, wherein the primary reflector is configured to receive and reflect RF signals in the plurality of radio frequency bands, where the primary reflector does not include a central opening;

a feed assembly that is movably coupled to the support assembly;

a first feed fixedly coupled to the feed assembly, where the first feed is configured to communicate RF signals in a first frequency band of the plurality of radio frequency bands;

a second feed fixedly coupled to the feed assembly, where the second feed is configured to communicate RF signals in a second frequency band of the plurality of radio frequency bands; and a first actuator configured to move the feed assembly from a first feed assembly position, where the first feed is positioned along a first signal path with the primary reflector, to a second feed assembly position, where the second feed is positioned along a second signal path with the primary reflector, wherein the antenna system is configured such that:

when the feed assembly is in the first feed assembly position, the second feed is not positioned to communicate RF signals in the second frequency band and when the feed assembly is in the second feed assembly position, the first feed is not positioned to communicate RF signals in the first frequency band.

2. The antenna system of claim 1, comprising:

a third feed fixedly coupled to the support assembly, where the third feed is configured to communicate RF signals in a third frequency band of the plurality of radio frequency bands; and a subreflector assembly movably coupled to the support assembly, wherein the subreflector assembly is movable, by a second actuator, between a first subreflector position and a second subreflector position, and wherein the antenna system is configured such that:

when the subreflector assembly is in the first subreflector position and the feed assembly is in the first feed assembly position, the subreflector assembly is positioned along the first signal path to reflect RF signals in the first frequency band between the primary reflector and the first feed;

when the subreflector assembly is in the first subreflector position and the feed assembly is in the second feed assembly position, the subreflector assembly is positioned along the second signal path to reflect RF signals in the second frequency band between the primary reflector and the second feed; and when the subreflector assembly is in the second subreflector position, the third feed is positioned to receive RF signals in the third frequency band of the plurality of radio frequency bands directly from the primary reflector.

3. The antenna system of claim 2, wherein, when the subreflector assembly is in the first subreflector position, the subreflector assembly intersects at least one of the first signal path or the second signal path.

4. The antenna system of claim 1, wherein:

the first actuator includes a first motor that is configured to drive a first lead screw; and the first lead screw is coupled to the feed assembly, such that the driving of the first lead screw causes movement of the feed assembly.

5. The antenna system of claim 1, further comprising a counterbalance that is movably coupled to the support assembly, wherein the counterbalance is configured to dynamically balance movement of the feed assembly via movement in a direction that is opposite to a direction of motion of the feed assembly.

6. The antenna system of claim 5, wherein the counterbalance includes a plurality of weight components.

7. The antenna system of claim 5, wherein the counterbalance includes a block upconverter configured to:

convert signals generated by a signal generator to signals having frequencies in the first frequency band for transmission by the first feed, and convert signals generated by the signal generator to signals having frequencies in the second frequency band for transmission by the second feed.

8. The antenna system of claim 5, wherein:

the first actuator is a first motor that is configured to drive a rotatable shaft; and the antenna system includes a second motor that is configured to drive the counterbalance.

9. The antenna system of claim 5, wherein:

the first actuator is a motor that is configured to drive a rotatable shaft;

the rotatable shaft is coupled to a first connector assembly configured to drive the feed assembly; and the rotatable shaft is coupled to a second connector assembly configured to drive the counterbalance.

10. The antenna system of claim 4, wherein:

a second actuator includes a second motor that is configured to drive a second lead screw; and the second lead screw is coupled to a counterbalance that is movably coupled to the support assembly, such that the driving of the second lead screw causes movement of the counterbalance.

11. The antenna system of claim 5, wherein:

the first actuator is a first solenoid that is coupled to the feed assembly; and the antenna system includes a second solenoid that is coupled to the counterbalance.

12. The antenna system of claim 5, wherein the primary reflector is positioned between the feed assembly and the counterbalance, and the feed assembly moves along a rotational path between the first feed assembly position and the second feed assembly position.

13. The antenna system of claim 1, including:

a first rubberized waveguide coupled to the first feed and configured to receive a first RF signal in the first frequency band from the first feed; and a second rubberized waveguide coupled to the second feed and configured to receive a second RF signal in the second frequency band from the second feed.

14. The antenna system of claim 1, wherein the feed assembly moves along a linear path between the first feed assembly position and the second feed assembly position.

* * * * *